(12) United States Patent
Audet et al.

(10) Patent No.: US 7,500,841 B2
(45) Date of Patent: Mar. 10, 2009

(54) APPARATUS FOR PUMPING GASES IN A FILM

(75) Inventors: Paul A. Audet, Spartanburg, SC (US); David Godino, Sr., Mauldin, SC (US)

(73) Assignee: Cryovac, Inc., Duncan, SC (US)

( * ) Notice: Subject to any disclaimer, the term of this patent is extended or adjusted under 35 U.S.C. 154(b) by 933 days.

(21) Appl. No.: 10/878,474

(22) Filed: Jun. 28, 2004

(65) Prior Publication Data

US 2005/0285311 A1  Dec. 29, 2005

(51) Int. Cl.
*B29C 47/88* (2006.01)
(52) U.S. Cl. .................. 425/71; 425/72.1; 425/327; 425/363
(58) Field of Classification Search .......... 425/71, 425/72.1, 327, 363
See application file for complete search history.

(56) References Cited

U.S. PATENT DOCUMENTS

| | | | |
|---|---|---|---|
| 3,022,543 A | 2/1962 | Baird, Jr. et al. | |
| 3,052,395 A | 9/1962 | Scott | |
| 3,330,748 A | 7/1967 | Lawton | |
| 3,466,356 A | 9/1969 | Carlson, Jr. et al. | |
| 3,664,783 A | 5/1972 | Murray | |
| 3,740,173 A | 6/1973 | Natelson | |
| 3,744,111 A | 7/1973 | Stumpf | |
| 4,380,311 A | 4/1983 | Torii | |
| 4,448,792 A | 5/1984 | Schirmer | |
| 4,604,038 A | 8/1986 | Belew | |
| 4,631,017 A * | 12/1986 | Hayashi | 425/335 |
| 5,096,393 A | 3/1992 | Van Steenderen et al. | |
| 5,215,450 A | 6/1993 | Tamari | |
| 5,837,358 A | 11/1998 | Bauer et al. | |
| 5,871,341 A | 2/1999 | Melody | |
| 5,941,696 A | 8/1999 | Fenstermacher et al. | |
| 6,082,988 A * | 7/2000 | Muller et al. | 425/363 |
| 6,129,275 A | 10/2000 | Urquhart et al. | |
| 6,203,750 B1 | 3/2001 | Ahlgren et al. | |

(Continued)

FOREIGN PATENT DOCUMENTS

EP  1 419 870  5/2004

(Continued)

OTHER PUBLICATIONS

European Search Report for 05253992.1 dated Oct. 25, 2005.

*Primary Examiner*—Robert B Davis
(74) *Attorney, Agent, or Firm*—Alston & Bird LLP

(57) ABSTRACT

The invention is a process and apparatus for producing a cross-linked, tubular film or "tape" that uses a motor driven nip roll assembly and a product driven idler roll to pump gases contained within the film in a desired direction. The process eliminates the need to create slits to vent gases that are trapped within the film. The motor driven roll comprises a driven nip roll and a driven peristaltic roll that cooperate to drive the film forward and nip the film. The driven peristaltic roll includes a pumping section that comprises a plurality of pumping rollers that pump gases contained within the film in a direction that is the reverse direction of film travel. The product driven roll comprises a spool roller and a plurality of pumping rollers that are circumferentially spaced around the spool roller. The pumping rollers trap and pump gases contained in the film in the reverse direction of film travel.

30 Claims, 18 Drawing Sheets

U.S. PATENT DOCUMENTS

| | | | |
|---|---|---|---|
| 6,511,655 B1 | 1/2003 | Muller et al. | |
| 7,205,017 B2 * | 4/2007 | Hayashi et al. | 426/502 |
| 2003/0228388 A1 * | 12/2003 | Hayashi et al. | 425/363 |
| 2004/0130060 A1 | 7/2004 | Hammer et al. | |

FOREIGN PATENT DOCUMENTS

JP  59230940  12/1984

* cited by examiner

APPARATUS FOR PUMPING GASES IN A FILM

BACKGROUND OF THE INVENTION

Polymeric films can be found in a variety of different applications such as food packaging, stretch wrap, plastic bags, and the like. Biaxially oriented film extrusion is a common technique for preparing polymeric films.

Biaxially oriented film is normally prepared by extruding a molten resin through a round die. The resin is forced around a mandrel inside the die, shaped into a sleeve, and extruded through an opening in the round die in the form of a tube. The molten tube is normally formed around an air pressure cylinder or chilled water caliper as it exits the die. The tube may be solidified by passing through a cooling ring. The tube then passes through a nip roll that collapses the tube into a relatively flat tube, also referred to as the "tape." Process gases can frequently be trapped within the tape. The tape can then be driven forward over a series of idler rolls and into an electronic crosslinking unit (ECLU). At the ECLU the tape is exposed to an irradiation source that promotes crosslinking.

The irradiating process typically produces hydrogen gas that is trapped within the tape. Hydrogen gas trapped within the tape can be problematic for several reasons. The gas sometimes causes small ignitions that damage the tape and that can result in temporary line stoppages. Hydrogen gas removal requires additional equipment on the production line to facilitate its removal. For example, slits can be created in the tape to help prevent the accumulation of hydrogen gas by providing openings through which the gas can escape. A heat seal is normally used to close the slits after most of the gases have escaped from within the tape. Forming slits and heat seals is an undesirable solution because this action can result in additional downtime. As a result, the entire process is less efficient, more complex, and can require a production line having a larger footprint.

BRIEF SUMMARY OF THE INVENTION

The invention is an improved process for preparing films. The process includes a driven reverse peristaltic nip roll assembly (nip roll assembly) and a product or tape driven reverse peristaltic idler roll (RPR idler) that each peristaltically pumps gases trapped within the film in a desired direction. The rolls can be used to pump hydrogen gas and process gases in the direction of the die where the gases can be removed. The process eliminates the need to vent gases from within the tape, or form heat seals to close vent slits or eruption tears that can occur as a result of hydrogen gas ignition. As a result, the process is more efficient and the overall production line occupies a smaller footprint.

The nip roll assembly comprises a driven nip roll and a driven peristaltic roll that cooperate to drive the tape forward and nip the tape. The driven nip roll comprises a generally elongated cylindrical roll that grips and drives the tape forward between itself and the driven peristaltic roll. The driven peristaltic roll comprises a pumping section having a plurality of elongated pumping rollers that each independently rotate about their own axes in the same direction of tape travel while collectively rotating as a pumping section in the reverse direction of tape travel. As the tape passes between the driven nip roll and the driven peristaltic roll, gases contained within the tape are trapped in passive channels that exist between each of the pumping rollers. The reverse rotation of the pumping section peristaltically pumps the trapped gases in the reverse direction of tape travel.

The operation of the product driven RPR idler roll is similar to the operation of the pumping section for the motor driven roll, which is described above. The RPR idler roll has a plurality of elongated pumping rollers that rotate about their own axes, and a central spool roller that rotates about a stationary shaft. Tape travel over the pumping rollers causes the pumping rollers to each rotate about their own axes in a direction that is substantially the same as the direction of tape travel. As the pumping rollers are rotated, small gears disposed on the pumping rollers drivingly intermesh with a stationary ring gear that is fixed relative to the spool roller. The gearing results in the spool roller and the plurality of pumping rollers as whole, rotating about the stationary axis in a direction that is opposite the direction of tape travel. Gases contained within the tape are trapped in passive channels that exist between each pumping roller. The rotation of the spool causes the trapped gases to be peristaltically pumped through the tape in the reverse direction of tape travel. In alternate embodiments, the RPR idler roll can be used to pump gases in the same direction of tape travel provided that the gearing is changed to prevent reverse rotation of the pumping rollers.

Thus, the invention provides a motor driven roll and a product driven roll that can be used in a process for producing a film product that eliminates gases without having to produce slits or heat seals. As a result, the process is more efficient, requires less space, and results in less product loss.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 shows a system for irradiating skin in accordance with the invention. The system includes an applicator 13, to be described in detail below, configured to apply light energy to regions of skin of an individual 22. The applicator 13 is connected to a control unit 11 via a cable 12. The control unit 11 includes a power source 18 that is connected to one or more light sources in the applicator 13 via wires in the cable 12. The system also includes a source of negative pressure 15 such as a vacuum pump. As explained below, the vacuum pump is used to create a negative pressure in the applicator 13 by means of a vacuum hose in the cable 12 connecting the vacuum pump to the applicator 13. The control unit 11 has an input device such as a keypad 10 that allows an operator to input selected values of parameters of the treatment, such as the pulse duration and intensity of the light energy. The control unit 11 optionally contains a processor 9 for monitoring and controlling various functions of the device.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
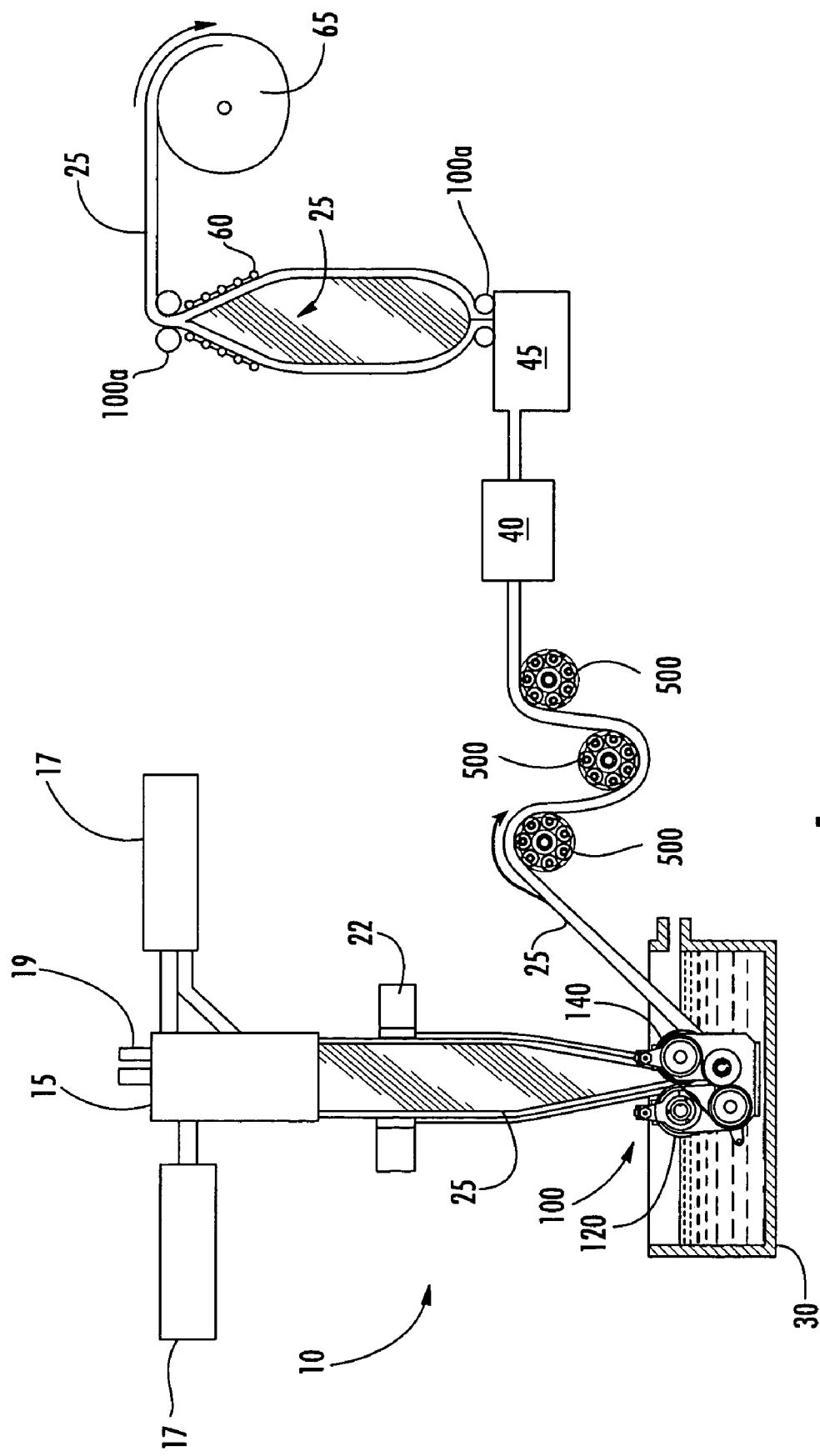

With reference to FIG. 1, a process for producing a film using a driven reverse peristaltic nip roll assembly (nip roll assembly) and a product driven reverse peristaltic idler roll (RPR idler) is schematically illustrated. As shown in FIG. 1, various polymeric formulations can be supplied to a circular die 15, which may have one or more extruders 17. The various layers of film are joined within the die 15, resulting in the formation of tube 25, which is a substantially unoriented tube comprising a single or multi-layered film.

The circular die 15 is heated in conventional fashion by means not shown. As tube 25 emerges from the die it is drawn past a cooling ring or air shoe 22 in the direction of nip assembly shown generally at 100. The nip roll assembly 100 in some embodiments can be disposed in a chill bath 30. The nip roll assembly 100 comprises two rollers: a driven nip roll 120 and a driven peristaltic roll 140 that in conjunction drive bubble 25 forward from the die 15 and collapse the bubble 25 to form a flattened tape. The nip roll assembly 100 peristaltically pumps gases contained within the tape 25 in a desired direction, which is typically in the direction of the die. The production line can contain several driven nip roll assemblies, if desired.

After exiting the nip assembly 100, the tape 25 is driven forward in the direction of an electronic crosslinking unit (ECLU) 40. The tape normally travels over several reverse peristaltic idler rolls (RPR idler rolls) 500 as it moves forward. The rolls 500 support and maintain the tape at a desired level of tension and pump gases back towards the die. At the ECLU 40, the polymers that comprise the tape are crosslinked. Crosslinking produces hydrogen gas as a byproduct. The RPR nip assembly 100 and RPR idler roll 500 work in conjunction to pump the hydrogen and other process related gases in a desired direction, typically towards the die 15 where the gases can be safely vented through a vent pipe 19 or other means. In some embodiments, the die may have a passageway that is adapted for having the gases pass through the passageway and through vent 19.

After the tape has passed through the ECLU, it is typically fed into a heating chamber 45. The heating chamber 45 heats the tape 25 to a temperature at which the tape can be oriented. In some embodiments a pinch roll 100a can be disposed adjacent to the outlet of the heating chamber 45. The pinch roll 100a can be a nip roll assembly that is in accordance with the invention.

The pinch rolls 100a forward the now heated tube 25 into an orientation zone, in which the emerging heated tape is stretched and drawn, resulting in the formation of a bubble or tube of oriented film 25. The heated tube 25 is drawn towards pinch rolls, which drive forward the resulting film 25. The film is cooled and gradually flattened with the aid of converging rolls 60. The resulting film 25 can be fed to windup roll 65, which is rotated by a motor (not illustrated).

It should be evident that the placement and quantity of nip roll assemblies 100 and RPR idler rolls 500 can be varied depending upon many factors such as the size of the line, plant layout, and the like. It should also be evident that the nip roll assembly 100 and RPR idler roll 500 could be used in a variety of different film producing applications. As used herein, the terms "film" and "tape" are used interchangeably to refer to a polymeric product that is produced through a melt extrusion process, and includes films, webs, laminates, sheets, and the like.

Figure 2:
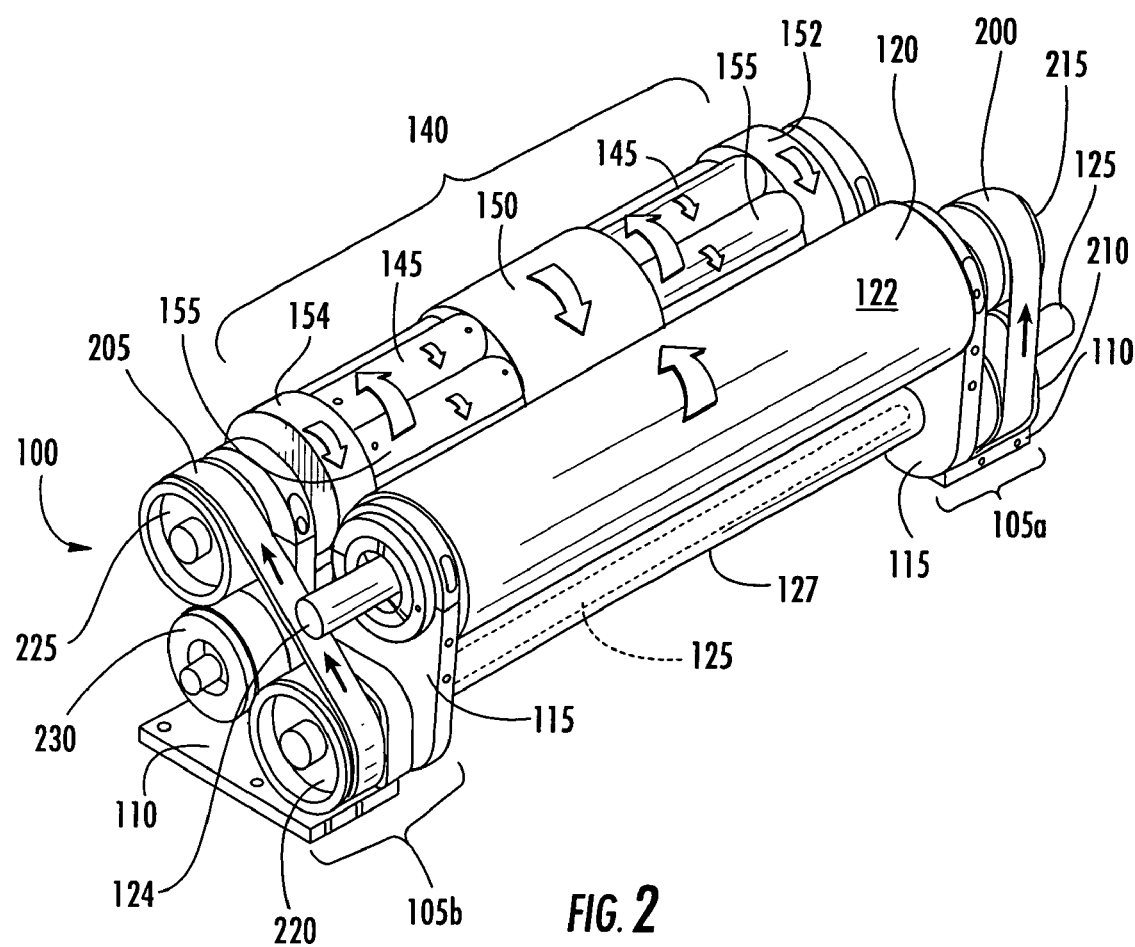
FIG. 2 is a graphical illustration of a driven reverse peristaltic nip roll assembly that is in accordance with the invention.

With reference to FIG. 2, a nip roll assembly is illustrated and broadly designated as reference number 100. As discussed above, the nip roll assembly drives the tape in a forward direction, nips the tape, and can pump gases contained within the tape.

The nip roll assembly 100 comprises a driven peristaltic roll 140 and a driven nip roll 120. The driven nip roll 120 is driven in a forward direction that is substantially the same direction of tape travel. The driven peristaltic roll 140 includes one ore more pumping sections 145 that are driven in the reverse direction of tape travel. The pumping section 145 is comprised of a plurality of generally elongated pumping rollers 155 that each independently rotate about their own axes in a direction that is generally opposite the rotational direction of the pumping section. The reverse rotation of the pumping section 145 pumps gases contained within the tape in a direction that is in the reverse or opposite direction of tape travel. The driven peristaltic roll 140 also typically includes a nip section 150 that cooperates with the driven nip roll 120 to nip the tape as it passes between the driven nip roll 120 and the nip section 150. The nip section is typically rotated in the forward direction.

The driven nip roll 120 is typically driven by a motor that rotates the driven nip roll in a forward direction. As illustrated in FIG. 2, the driven nip roll 120 is generally an elongated cylinder roll. The surface of the nip roll 122 typically comprises a material that grips and drives the tape forward without fracturing or cracking the tape. Suitable materials include, without limitation, rubber, polymeric plastics, cork, steel, stainless steel, metallic alloys, and the like. It should be recognized that a variety of different materials can be used for the surface of the driven nip roll provided that the surface can grip and drive the tape forward without causing damage to the tape.

The driven peristaltic roll 140 and driven nip roll 120 are typically supported by housing members 105a, 105b. For ease of convenience, the housing member that is closest to the motor is referred to as the proximal housing member 105a, and the housing member that is the farthest from the motor is referred to as the distal housing member 105b. Each housing member can be a single unitary body, or alternatively can be comprised of two or more structural support members that are attached together to form the housing member. In this regard, FIG. 2 illustrates an embodiment wherein the housing member 105 is comprised of a frame plate 110 and a hub plate 115. The frame plate 110 can support both the driven peristaltic roll 140 and hub plate 115.

In operation, the driven nip roll 120 and driven peristaltic roll 140 can be driven from any suitable source of power such as an electric motor (not illustrated) and belts 200, 205 in a conventional manner. It should be recognized that the motor could be joined to the nip roll assembly 100 in a variety of different ways including direct attachment to either the driven nip roll or the driven peristaltic roll. In addition, nip roll assembly 100 could be driven using two separate motors, although not necessarily with equivalent results. It should also be understood that the position of the motor with respect to the housing members could be reversed.

In one embodiment, the motor can be attached to a power transfer shaft 125. The transfer shaft 125 can be used to rotate both the driven peristaltic roll 140 and the nip roll 120. In this regard, FIG. 2 depicts a power transfer shaft 125 that is in mechanical communication with both the driven peristaltic roll 140 and the driven nip roll 120. Typically, the motor rotates the transfer shaft 125 in a forward direction. The transfer shaft 125 is depicted as extending from the proximal housing member 105a to the distal housing member 105b. The transfer shaft 125, as represented by the dashed lines, can be disposed within tubing 127 that extends from the proximal housing member to the distal housing member. The use of tubing 127 can be beneficial because it may help protect the transfer shaft 125 from dirt and debris, and can also be used as a means for opening and closing the nip roll assembly 100, which is described in greater detail below.

The transfer shaft 125 can provide rotation to the driven nip roll 120 in a variety of different ways. An exemplary method of rotating the driven nip roll is illustrated in FIG. 2. A pulley 210 can be disposed on transfer shaft 125 and in mechanical communication via a belt 200 with a second pulley 215 that is disposed on a shaft 124 that is depicted as extending through the driven nip roll 120. The shaft 124 could extend from the proximal housing member 105a to the distal housing member 105b. Rotation of the transfer shaft 125 in the forward direction likewise rotates shaft 124 in the forward direction, resulting in the forward rotation of driven nip roll 120. It should be recognized that the driven nip roll could be rotated using other mechanisms, which include by way of example and not limitation, sprocket and chain drives; gear drives, additional motors, and the like.

With reference to FIG. 2, an exemplary method for rotating the driven peristaltic roll 140 is also illustrated. Similar, to the rotational method described above, the driven peristaltic roll 140 can also be driven using a combination of belt and pulleys. A transfer pulley 220 can be disposed near the distal end of the transfer shaft 125. A second pulley 225 can be disposed near the proximal end of an idler shaft (see FIG. 3 reference number 130), and can be in mechanical communication with the transfer pulley 220 via a belt 205. Rotation of the transfer shaft 125 rotates pulley 220 resulting in the rotation of belt 205 and pulley 225. As a result, the idler shaft and pumping section are rotated in the reverse direction of tape travel. Additionally, the speed at which the driven peristaltic roll 140 rotates and pumps gases can be increased or decreased. The rotational speed can be adjusted by changing the size of pulley 225. For example, the size of pulley 225 can be reduced to operate the driven peristaltic roll at higher speeds relative to the speed of the nip roll. The nip roll assembly 100 can also contain a tensioner 230 to increase the tension on belt 205. The tensioner can be in the form of a moveable pulley or equivalent mechanism. The ability to change the amount of tension applied to pulleys 220, 225 can improve rotation of the driven peristaltic roll.

Rotation of the driven peristaltic roll 140 can also be accomplished in numerous ways and should not be limited by the example described above. The idler shaft 130 could also be driven with an additional motor, a chain and sprocket combination, a gearing mechanism, etc. Additionally, a third pulley disposed on the proximal housing member could drive the idler shaft. The third pulley could be in mechanical communication with pulleys 210 and 215.

Figure 3:
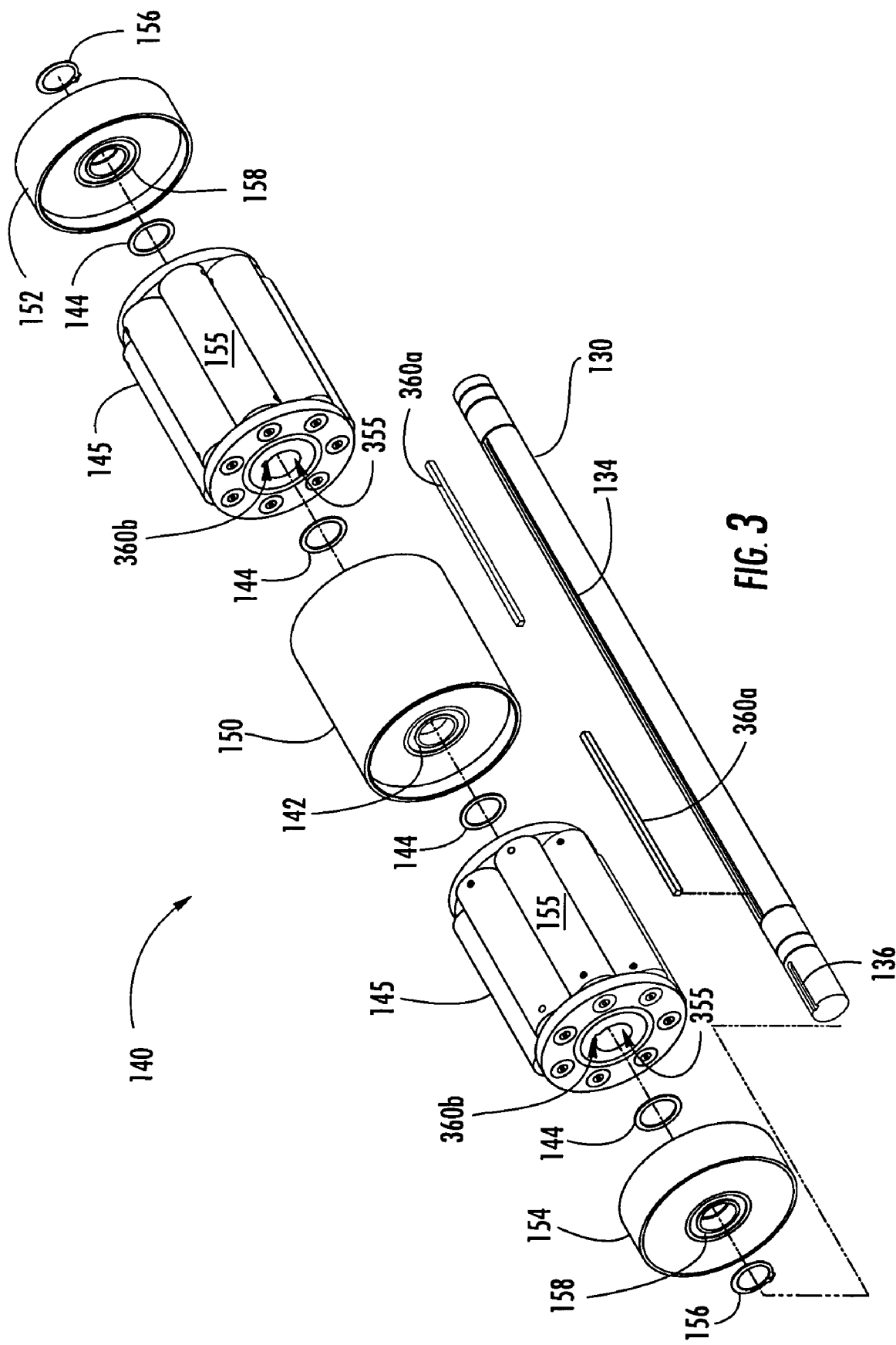
FIG. 3 is an exploded view of a driven peristaltic pumping roll that is in accordance with the invention.

With reference to FIG. 3, an exploded view of one embodiment of the driven peristaltic roll 140 is illustrated. The driven peristaltic roll typically comprises a central idler shaft 130 about which the pumping section(s) 145 and nip section 150 are disposed. The driven peristaltic roll can also include stabilizing members 152, 154, which are discussed in greater detail below. The pumping and nip sections each have a central passageway 355 through which the idler shaft can be inserted. Retaining rings 156 or other clamping devices can be used to positionally secure the pumping section and nip section on the idler shaft. The driven peristaltic roll can also include spacers 144 that are disposed on the idler shaft between the pumping section(s) and the nip section.

Figure 4:
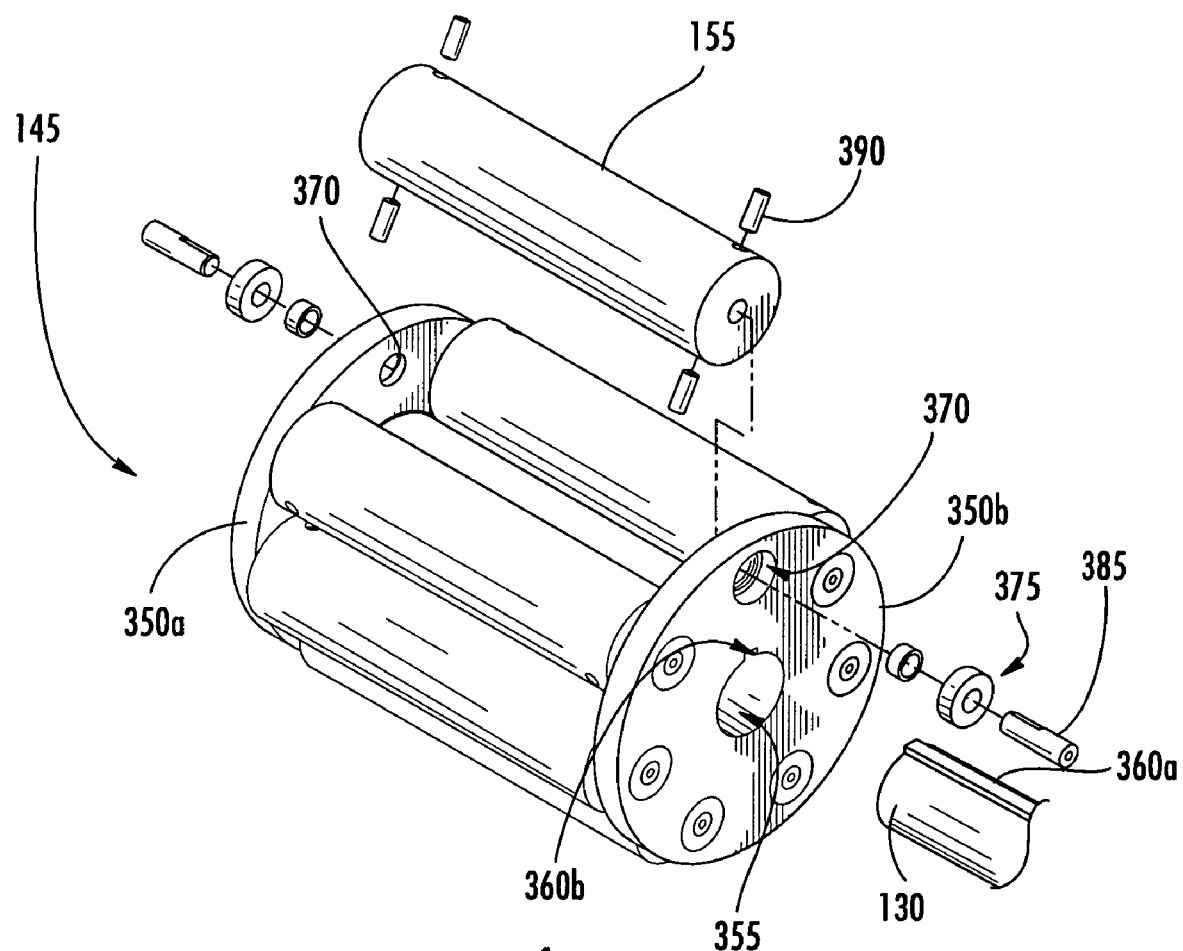
FIG. 4 is a graphical illustration of an exploded view of a pumping section that is in accordance with the invention.

Typically, the idler shaft is in mechanical communication and rotatably driven by a motor. The pumping section 145 is usually rotatably fixed or secured to the idler shaft 130 so that rotation of the idler shaft will also rotate the pumping section 145. The pumping section and shaft can be keyed (see 360b and 360a) so that rotation of the pumping section is fixed relative to the shaft. FIGS. 3 and 4 illustrate that the idler shaft 130 can be transversely slotted 134 for receipt of a key 360a. A corresponding slot 360b for fixedly receiving the key is shown as being present in the central passageway 355 through which the idler shaft 130 can be inserted. As a result, rotation of the idler shaft also rotates the pumping section. It should be recognized the type of key used and its placement could be varied depending upon the designer's particular preference, and that other methods could be used to rotatably fix the pumping section to the idler shaft.

The nip section 150 can be rotated independently of the idler shaft 130 and is typically supported by friction reducing members 142 that are disposed between the idler shaft and the nip section. As a result, rotation of the idler shaft does not rotate the nip section. FIG. 3 shows that the idler shaft can contain friction reducing member(s) 142 that allows the nip section to rotate freely about the idler shaft 130. In some embodiments, the nip section 150 will have two or more friction reducing members 142. Suitable friction reducing members include bearings such as an idler bearing. The bearings can be comprised of a wide variety of materials including, but not limited to stainless steel, ceramic, aluminum, plastic, metallic alloys such as bronze, and the like. It should be recognized that other methods such as packed grease, for example, could be used to facilitate rotation of the nip section about the idler shaft, although not necessarily with equivalent results.

The nip section 150 is adapted for nippingly engaging with the driven nip roll 120. The nip section 150 cooperates with the nip roll 120 to collapse the bubble and nip the tape as it passes between the two rollers 140, 120. Rotation of driven nip roll 120 in the forward direction applies rotational pressure to nip section 150, resulting in the forward rotation of the nip section 150. The surface 122 (see FIG. 7) of the nip section typically comprises a material that grips and drives the tape forward without fracturing or cracking the tape. Suitable materials include, without limitation, rubber, polymeric plastics, cork, steel, stainless steel, metallic alloys, and the like. It should be recognized that a variety of different materials can be used for the surface of the nip section provided that the surface can grip and drive the tape forward without causing damage to the tape. It should also be recognized that the driven peristaltic roll does not necessarily have to include a nip section, and that the pumping section 145 could be used to nippingly engage the nip roll 120.

The pumping section in some embodiments can have a slightly smaller diameter than the nip section. Having a slightly smaller diameter can help prevent the pumping section from nipping the tape and thus help prevent damage to the edge of the tape. Additionally, it can allow the pumping section to more effectively pump gases through the tape.

As stated above, the driven peristaltic roll 140 in some embodiments can also include a pair of stabilizing members 152, 154. The stabilizing members are typically disposed at the proximal and distal outside edges of the driven peristaltic roll and can typically rotate freely about the idler shaft 130. In this regard, FIGS. 2 and 3 illustrate a proximal and distal stabilizing member disposed on the driven peristaltic roll. A bearing or other friction reducing mechanism 158 is disposed between the stabilizing member and the idler shaft. The bearing allows the stabilizing members to rotate freely about the idler shaft. Typically, an idler bearing or other means is used to facilitate independent rotation of the stabilizing members about the idler shaft.

During use, the surface of the stabilizing members 152, 154 can be brought into contact with the surface of the driven nip roll 120. As a result, rotation of the driven nip roll in some embodiments can also rotate the stabilizing members about the idler shaft. Typically, the stabilizing members and driven nip roll rotate in a 1:1 ratio. The use of stabilizing members is beneficial because it helps maintain the edges of the driven peristaltic roll 140 in a 1:1 rotation with the nip roll 120. Additionally, the stabilizing members help prevent side-to-side movement of the tape as it travels between the driven nip roll and driven peristaltic roll. As a result, tape edge damage can be reduced or substantially eliminated.

Figure 5:
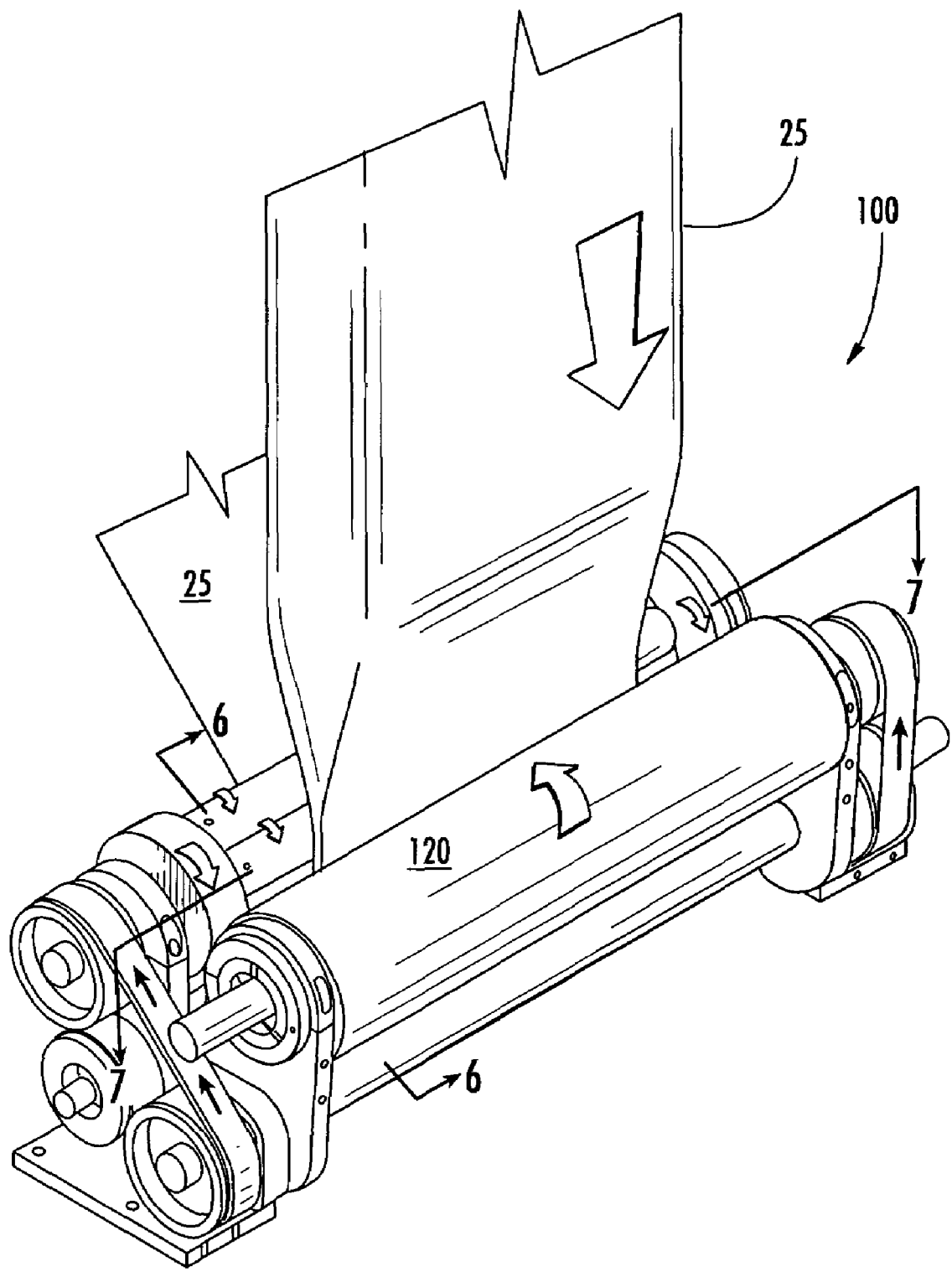
FIG. 5 is a graphical illustration of the driven reverse peristaltic nip roll assembly of FIG. 2 depicting the tape traveling between the driven nip roll and the driven peristaltic roll.

Typically, the edges of the tape 25 are not in contact with the stabilizing members 152, 154. In this regard, FIG. 5 illustrates that the tape 25 does not cover the entire surface of the pumping section 145. This orientation can be useful where the nip roll assembly 100 is disposed in a chill bath. In situations where the nip roll assembly is disposed in a bath, water could be trapped in the passive channels and thereby prevent the tape from forming pockets of trapped gas within the channels. Leaving a portion of the pumping section not in contact with the tape can create passageways though which water in the channels can be displaced by gases contained within the tape.

With reference to FIG. 4, an exemplary pumping section 145 is illustrated. The pumping section comprises a plurality of pumping rollers 155 that are circumferentially spaced about the idler shaft 130, and a pair of support members 350a, 350b that are in mechanical communication with the idler shaft 130. Each support member contains a central passageway 355 in which the shaft 130 can be inserted. As described above, the support members can have a pump locking mechanism (see 360a and 360b) that cooperates with the shaft to fixedly attach the pumping section to the shaft.

The pumping rollers 155 can each have a proximal and distal end that in some embodiments are supported by friction reducing members 375 disposed within the support members at 370. The friction reducing members allow each pumping roller to rotate freely about its own axis. The friction reducing members in some embodiments are bearings, such as an idler bearing. In this regard, FIG. 4 illustrates the support members having a plurality of channels 370 for supporting and receiving the pumping rollers. Each pumping roller can be supported by a pair of bearings 375 that are disposed within the support members. Suitable bearings can be constructed out of stainless steel, ceramic, aluminum, plastic, metallic alloys such as bronze, and the like. Preferably, the bearings allow the rollers to rotate freely with a minimum amount of drag.

The pumping rollers can be secured within the support member in a variety of different ways. In some embodiments the pumping section can include locking shafts 385 screws, or bolts that can extend through the friction reducing members 375 and into the pumping rollers. Flat head screws, set screws, or bolts 390 could be used to fixedly secure the shafts 385 within the pumping rollers. It should be recognized that there can be a wide variety of ways that can be used to attach the pumping rollers to the support members provided that the pumping rollers can independently rotate about their own axes.

Figure 6:
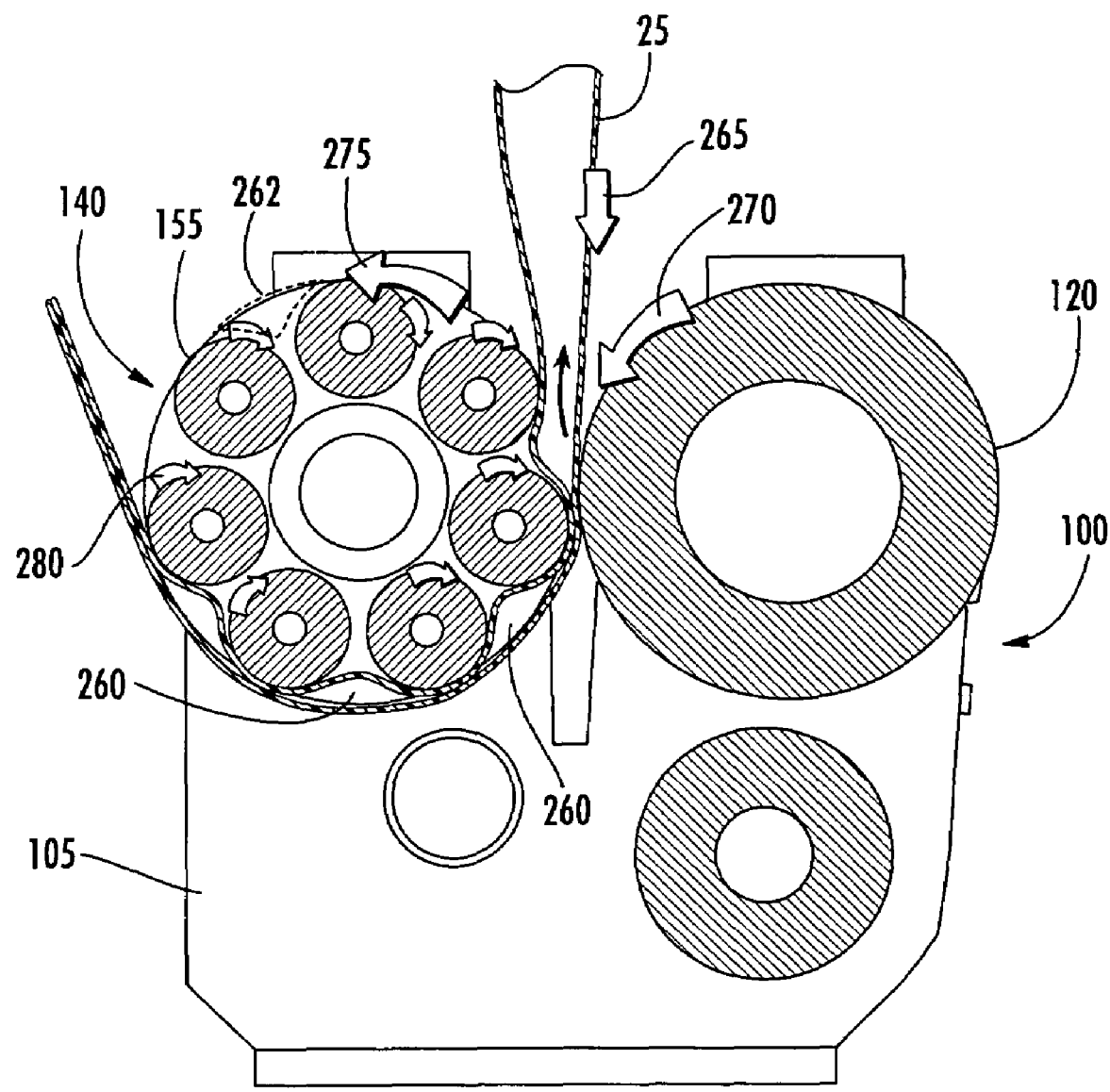
FIG. 6 is a graphical illustration of a cross sectional side perspective of the driven reverse peristaltic nip roll assembly viewed along line 6-6 of FIG. 5 depicting gases being pumped through the tape.
Figure 7:
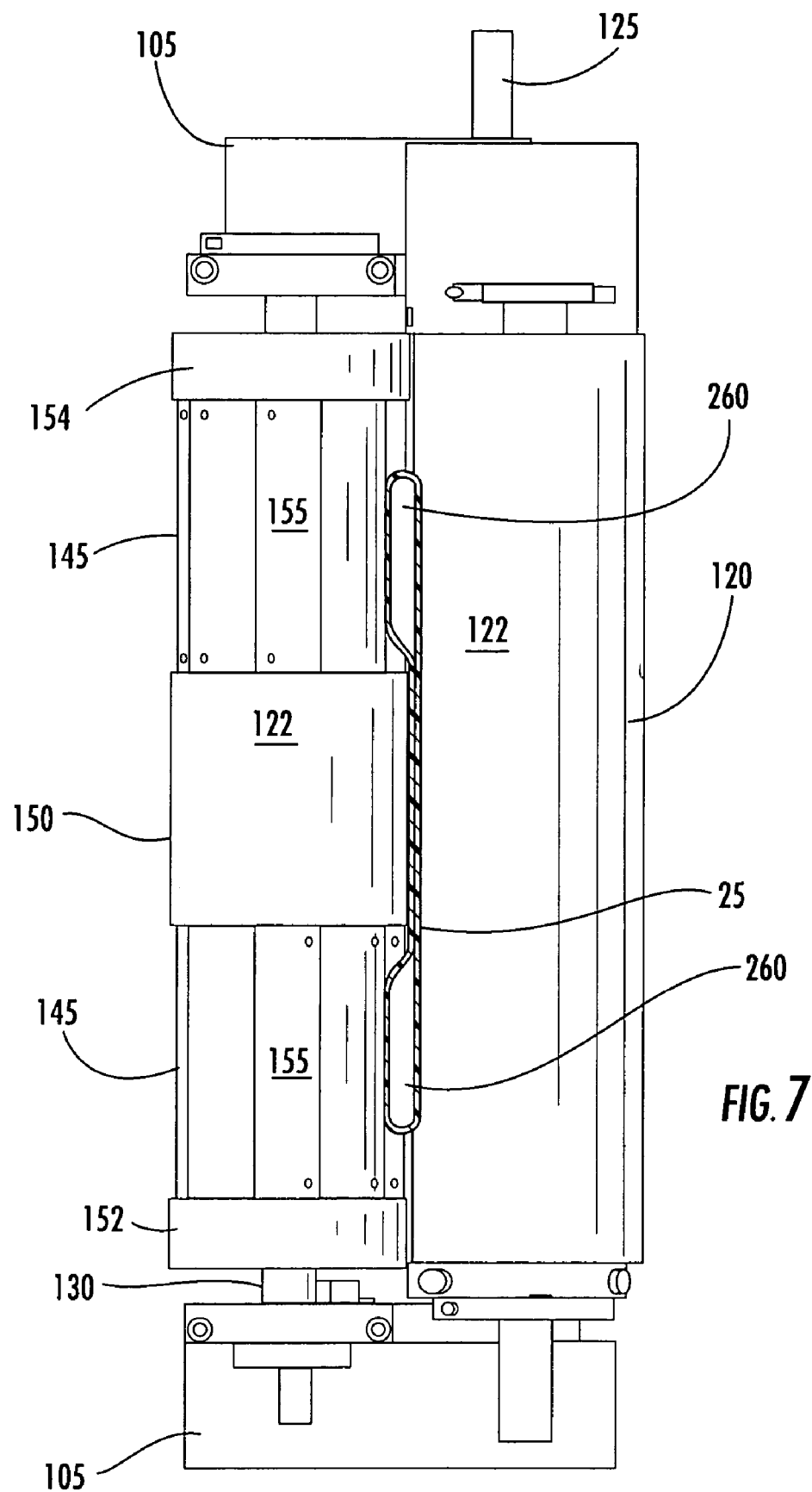
FIG. 7 is a graphical illustration of a top perspective of the driven reverse peristaltic nip roll assembly depicted in FIG. 5 viewed along line 7-7.

FIGS. 5-7 illustrate that the tape 25 is driven between the nip roll and the peristaltic roll 140 and travels about the peristaltic roll. FIG. 6 is a cross-sectional side view of the nip roll assembly 100 viewed along line 6-6 of FIG. 5 depicting gases being reversed pumped through the tape 25. FIG. 7 is a top view of the nip roll assembly 100 viewed along line 7-7 of FIG. 5 depicting gases 260 within the tape as the tape is driven between the driven nip roll and the driven peristaltic roll.

With reference to FIG. 6, the arrow labeled with reference number 265 illustrates the direction of tape travel as it driven forward by the driven nip roll 120. Arrow 270 represents the forward rotation of the nip roll. As the tape 25 travels across the pumping rollers 155, the pumping rollers each rotate about their own axes in a direction (represented by arrow 280) that is substantially the same as the direction of tape travel, while the pumping section 140 is rotating in the opposite direction of tape travel (represented by arrow 275). The independent rotation of the individual pumping rollers 155 allows the tape to travel over the pumping section without being damaged. Gases 260 contained within the tape are trapped in passive channels 262 that are created by the space between each pumping roller. As a result, the forward travel of the tape over the pumping rollers causes the pumping rollers to rotate about their own axes in the direction of tape travel; the pumping section on the other hand is being rotated in the reverse direction of tape travel. It is this reverse rotation of the pumping section that causes the trapped gases to be peristaltically pumped in the reverse direction of tape travel.

Figure 8A:
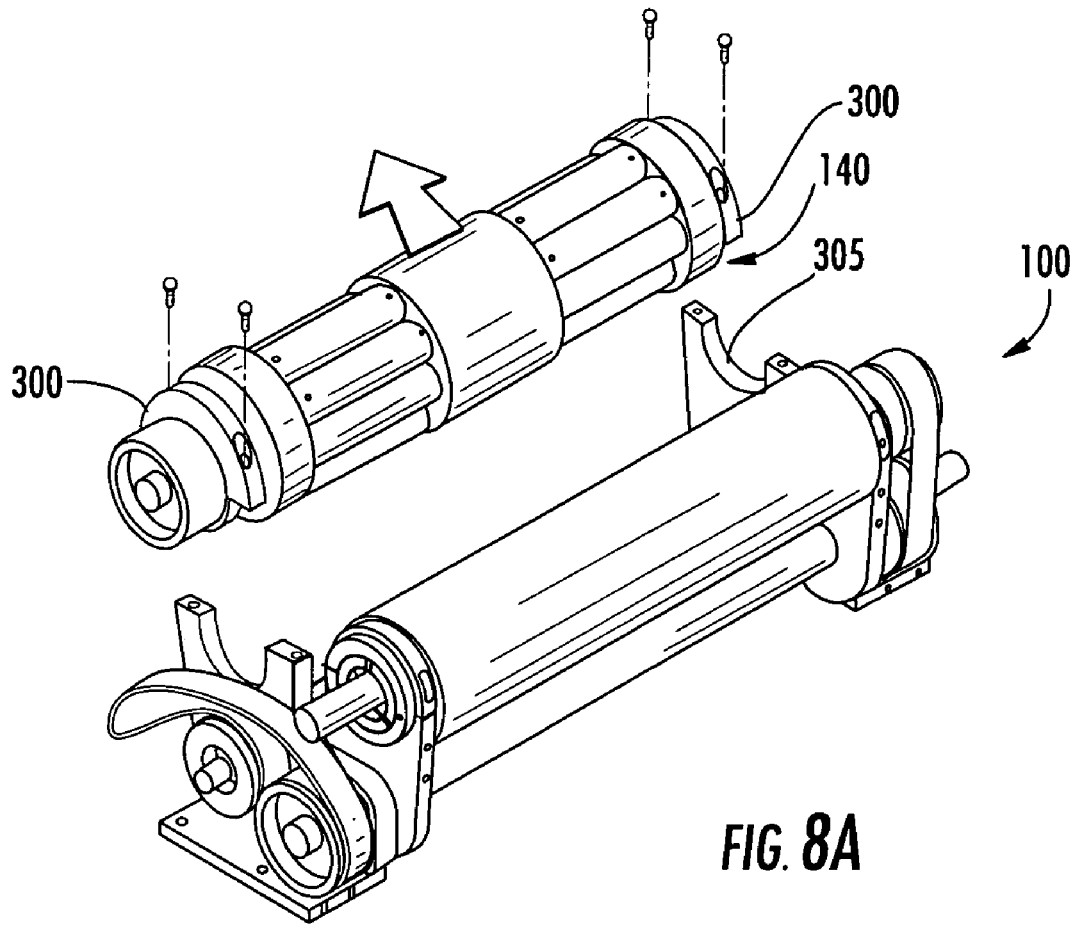
FIG. 8A is a graphical illustration of a driven peristaltic reverse nip roll assembly depicting detaching the peristaltic pumping roll from the housing members.
Figure 8B:
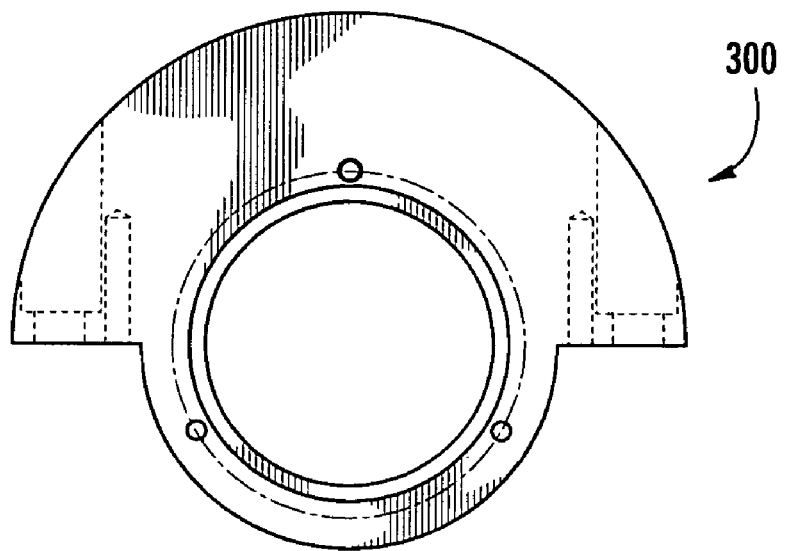
FIG. 8B is a illustration of the driven peristaltic pumping roller detaching member.

In an alternative embodiment, the driven peristaltic roll can be easily detached and removed from nip roll assembly 100. Depending upon need, the driven peristaltic roll could be removed and interchanged with a driven peristaltic roll having a different configuration. In this regard, FIGS. 8A and 8B illustrate an exemplary detaching mechanism for easily separating the driven peristaltic roll 140 from the housing members 105a, 105b. The detaching mechanism could be comprised of a pair of detaching members 300 that can be attached to the proximal and distal ends of the driven peristaltic roll. Typically the nip roll assembly would include a shoulder 305 or similar structure for receiving the driven peristaltic roll. The detaching members can be mechanically secured to the housing members using screws, pins, bolts, and the like.

Figure 9:
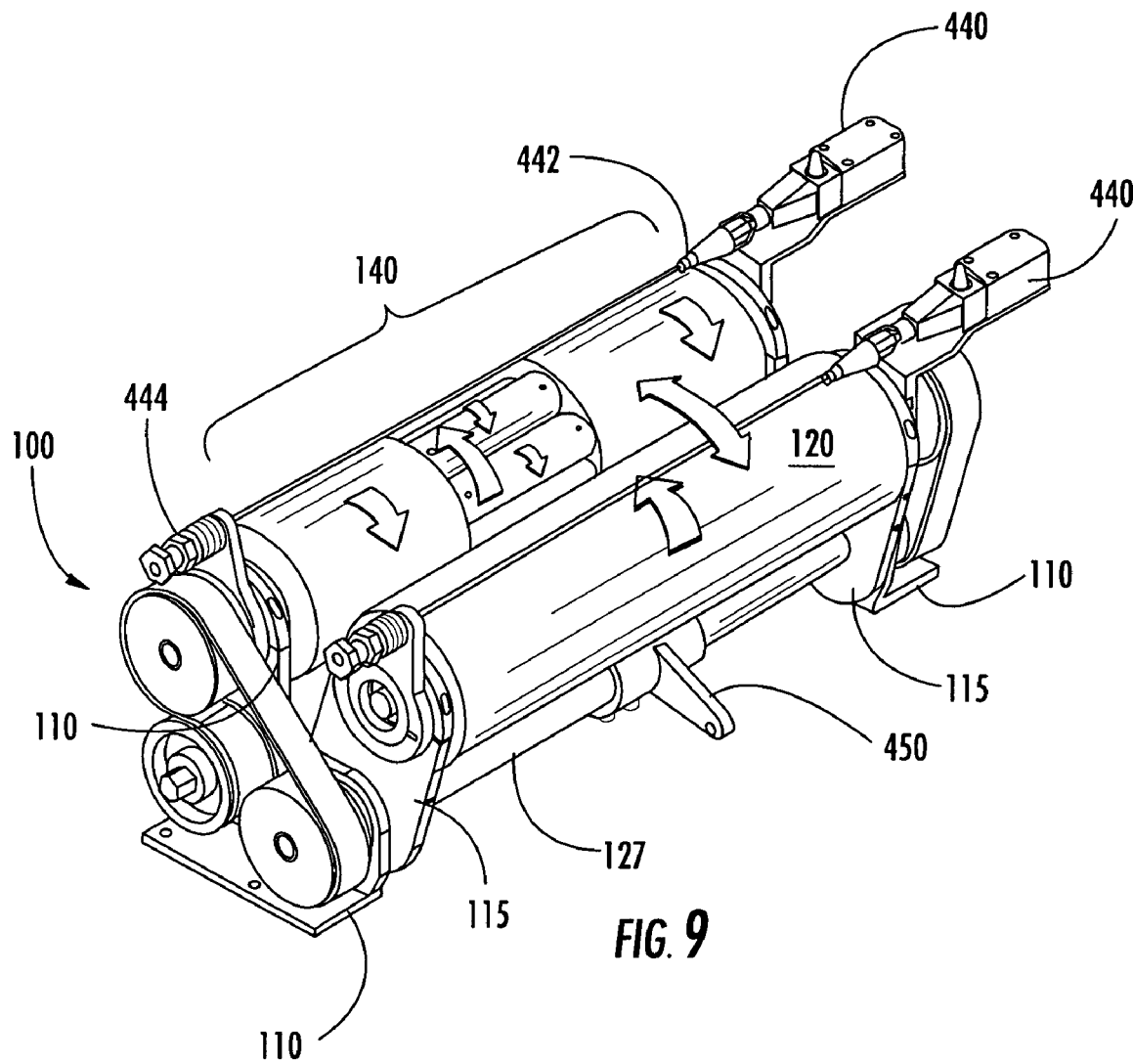
FIG. 9 is a graphical illustration of a second embodiment of a driven reverse peristaltic nip roll assembly that is in accordance with the invention.

As described above, the housing members in some embodiments can comprise a frame plate 110 and a hub plate 115. The hub plate is attached to the frame plate and is able to pivot independently of the frame plate. As a result, the nip roll assembly 100 can go from a closed position to an open position. In this regard, FIG. 9 shows that the driven nip roll 120 can pivot away from the driven peristaltic roll 140 to an open position. While in the open position, the tape can easily be threaded between the driven peristaltic roll and the driven nip roll. Nip roll assembly can be opened and closed in a wide variety of ways including, but not limited to, the use of an actuator or a piston that is that is attached to a powered device. The actuator or piston can also be used to maintain nip pressure. In some embodiments a clevis rod 450 is attached to tubing 127. When actuated, the piston applies pressure to the clevis and pivots the driven nip roll to the closed position. The operation of cylinders and actuators are well-known and the connecting equipment for the supply of power is not shown in the drawings as the specific mode of power supply has no relation to the present invention.

The invention may also include additional features that are included in conventional nip rolls, such as safety shut-off mechanisms. In this regard, FIG. 9 illustrates a nip shut-off device that can quickly stop rotation of the RPR nip assembly 100 and open nip roll 120. The nip shut-off device includes a cable that extends from a cable tensioner 444 to cable clamp 442. Additional tension or pressure on the cable may result in activation of the nip shut-off device. The nip shut-off device also may include a manually operated shut-off mechanism 440.

The motor driven rollers of the invention can be produced to have different lengths and diameters depending upon the particular film that is to be produced. The width of the nip roll assembly can vary depending upon the width of the film being produced. It should also be recognized that the configuration and dimensions of the driven peristaltic roll can also vary depending upon the particular film or tape. For instance, the nip roll assembly can be adapted to accommodate films that could be a small as 3 to 8 inches in width. In such an embodiment, the width of the nip section will be reduced so that a section of the tape extends over both the nip section and the pumping section. Additionally, the nip roll assembly can contain multiple pumping sections or multiple nip sections. For example, FIG. 2 illustrates the driven peristaltic roll having a single nip section and two pumping sections. FIG. 9 illustrates the driven peristaltic roll having dual nip sections and a single pumping section. The length of the nip roll 120 and the driven peristaltic roll assembly 140 can be from about 2 to 150 inches, with lengths from about 4 to 64 inches being somewhat more typical. The diameter of the nip roll 120 and the driven peristaltic roll assembly 140 is typically from about 1 to 24 inches, with diameters from about 4 to 18 inches being somewhat more typical.

Figure 10:
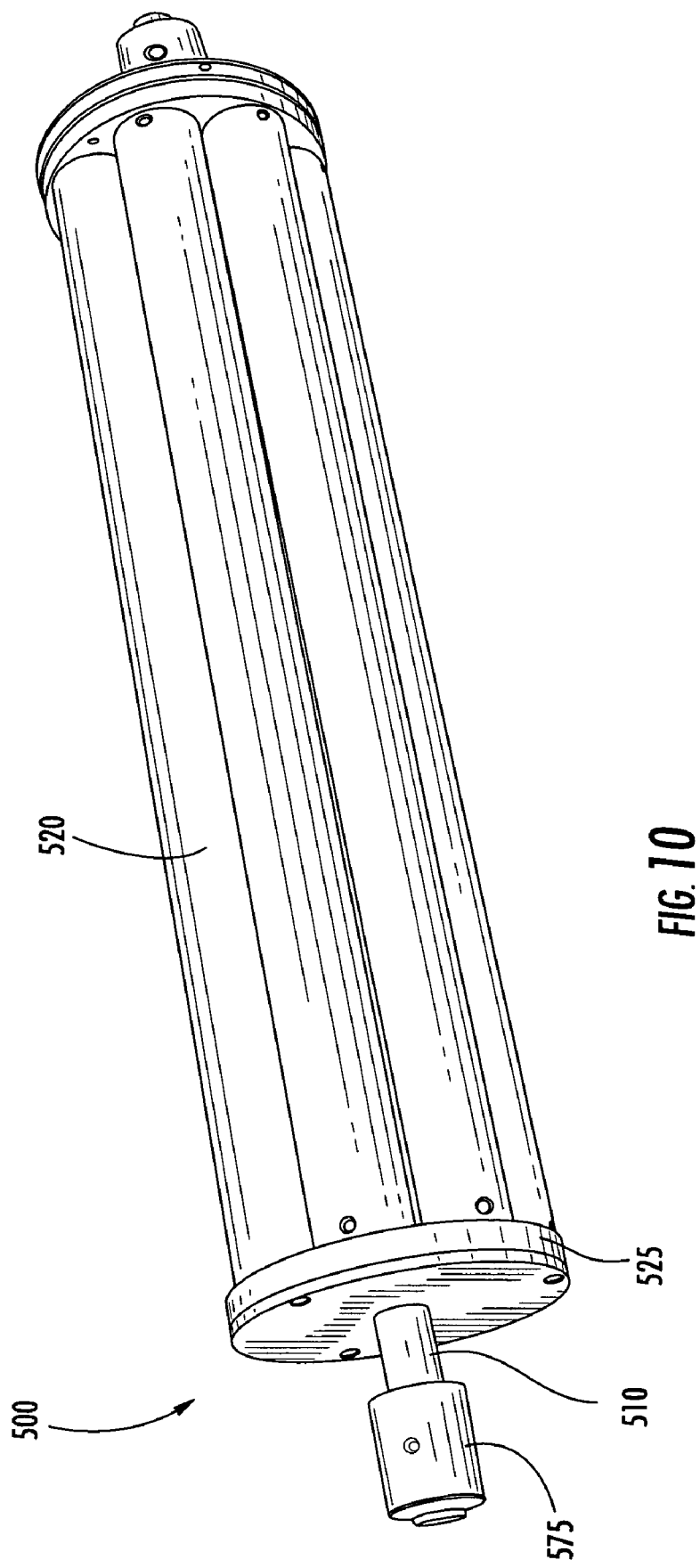
FIG. 10 is a graphical illustration of a reverse peristaltic idler roll that is in accordance with the invention.

The second aspect of the invention is a product driven reverse peristaltic idler roll (RPR idler roll) illustrated in FIG. 10, which is broadly designated by reference number 500. As discussed above, the RPR idler roll 500 is driven by tape running over its surface. The tape driven roll has two primary purposes. First, the roll supports and maintains the tension on the tape as it travels through the production line. Second, the roll is comprised of a plurality of smaller pumping rollers that pump gases contained within the tape in a desired direction. Typically, the gases are pumped in a direction that is opposite the direction of tape travel. If desired, however, the RPR idler roll 500 can be adapted to pump gases in the direction of tape travel.

The operation of the RPR idler roll 500 is similar to the operation of the pumping section for the motor driven roll, which is described above. The tape driven roll 500 has a plurality of generally elongated pumping rollers 520 that rotate about their own axes, and a central spool roller 525 that rotates about a stationary shaft 510. As the tape passes over the pumping rollers, the pumping rollers each rotate about their own axes in a direction that is substantially the same as the direction of tape travel. As the pumping rollers are rotated, small gears 530 (see FIG. 11) disposed on the pumping rollers drivingly intermesh with a stationary ring gear 535 (see FIG. 11) that is fixed relative to the spool roller. This results in the spool roller and the plurality of pumping rollers collectively rotating about the stationary axis in a direction that is opposite the direction of tape travel. Gases contained within the tape are trapped in passive channels that exist between each pumping roller. The rotation of the spool causes the trapped gases to be peristaltically pumped through the tape in a direction that is opposite the direction of tape travel. The structure and operation of the tape driven roll is described in greater detail below.

Figures 11, 11A:
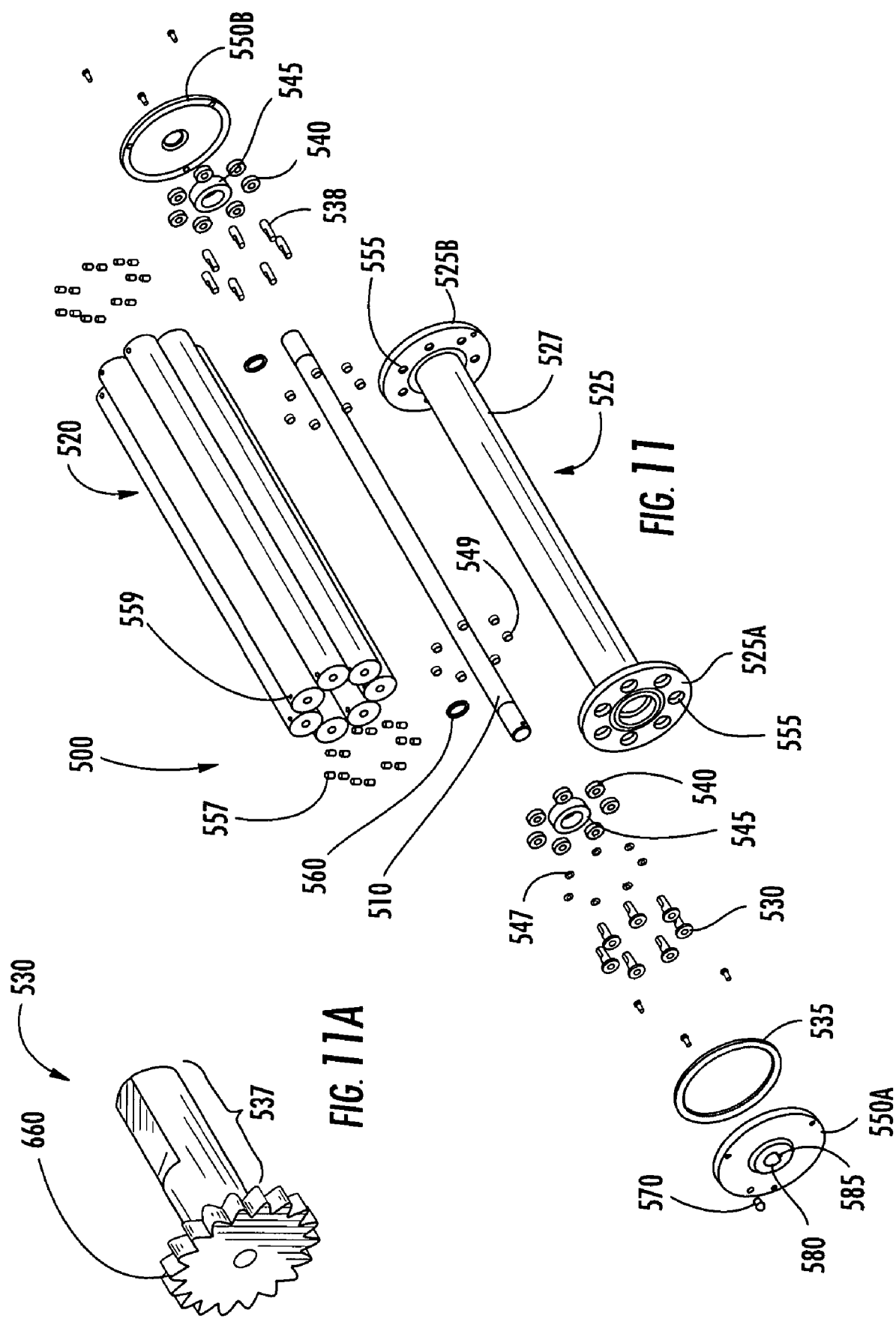
FIG. 11 is an exploded view of the reverse peristaltic idler roll depicted in FIG. 10.
FIG. 11A is a graphical illustration of a spur gear that is useful in the reverse peristaltic idler roll.

With reference to FIG. 11, the tape driven RPR idler roll 500 comprises a stationary shaft 510 around which a spool roller 525 and a plurality of pumping rollers 520 are rotataby disposed. The spool roller typically comprises first and second support members 525A, 525B that in some embodiments can be disc shaped, and a generally elongated tubular section 527 disposed between the support members. Typically, the spool roller can rotate freely around the stationary shaft 510. The spool roller may be positioned on the shaft with a retaining clip or other mechanism that prevents the spool from moving longitudinally along the shaft while at the same time allowing the spool to rotate freely about the shaft. In this regard, FIG. 11 illustrates a retaining ring 560 that can be used to lockingly position the spool roller on the stationary shaft. The RPR idler roll 500 can be secured to a film production line by attaching a mounting bracket 575 or other means to the stationary shaft (see FIG. 10).

The RPR idler roll 500 typically has frictional reducing members disposed between the stationary shaft and the spool. The friction reducing members are typically a bearing that allows the spool to rotate freely around the shaft. As shown in FIG. 11, a pair of bearings 545 can be disposed on the stationary shaft. A wide variety of different bearings can be used, such as an idler bearing. The bearings can comprise a variety of different materials including, without limitation, stainless steel, ceramic, aluminum, plastic, metallic alloys such as bronze, and the like. As shown in FIGS. 10 through 13 the plurality of smaller pumping rollers 520 are circumferentially spaced around the spool roller. Typically, the pumping rollers are evenly spaced about and parallel to the spool roller. The pumping rollers can be made from a variety of different materials including, but not limited to, aluminum, stainless steel, plastic, and the like. It should be recognized that a variety of different materials could be used provided that the pumping rollers are strong enough to support a tape under tension, while at the same time, being light enough so that rotation about their axes is not adversely affected.

The pumping rollers 520 are typically supported by friction reducing members 540 that are disposed within the support members 525A, 525B. The friction reducing members allow each pumping roller to rotate freely about its own axis. The friction reducing members are typically a bearing such as an idler bearing. In this regard, FIG. 11 illustrates the spool having a plurality of channels 555 for supporting the pumping rollers. Each pumping roller can be supported by a pair of bearings 540 that are disposed within the spool. Suitable bearings can be constructed out of stainless steel, ceramic, aluminum, plastic, metallic alloys such as bronze, and the like. Preferably the bearings allow the rollers to rotate freely with a minimum amount of drag. The pumping rollers 520 can be rotatably attached to the spool roller using shafts, bolts, screw, or the like (see reference number 538) that can extend through the friction reducing members 540 and into the pumping rollers. The pumping rollers can also contain small passageways 559 that can accommodate flat head screws, bolts, set screws, etc, (see reference number 557) that can be used for fixedly securing the pins 538 within the pumping rollers. With reference to FIG. 11A, the spur gear 530 can comprise a shaft 537 for rotatably securing the pumping rollers to the spool roller, and gear teeth 660. Spacers 547, 549 can also be used to help control tolerances between the rolls.

Figure 14:
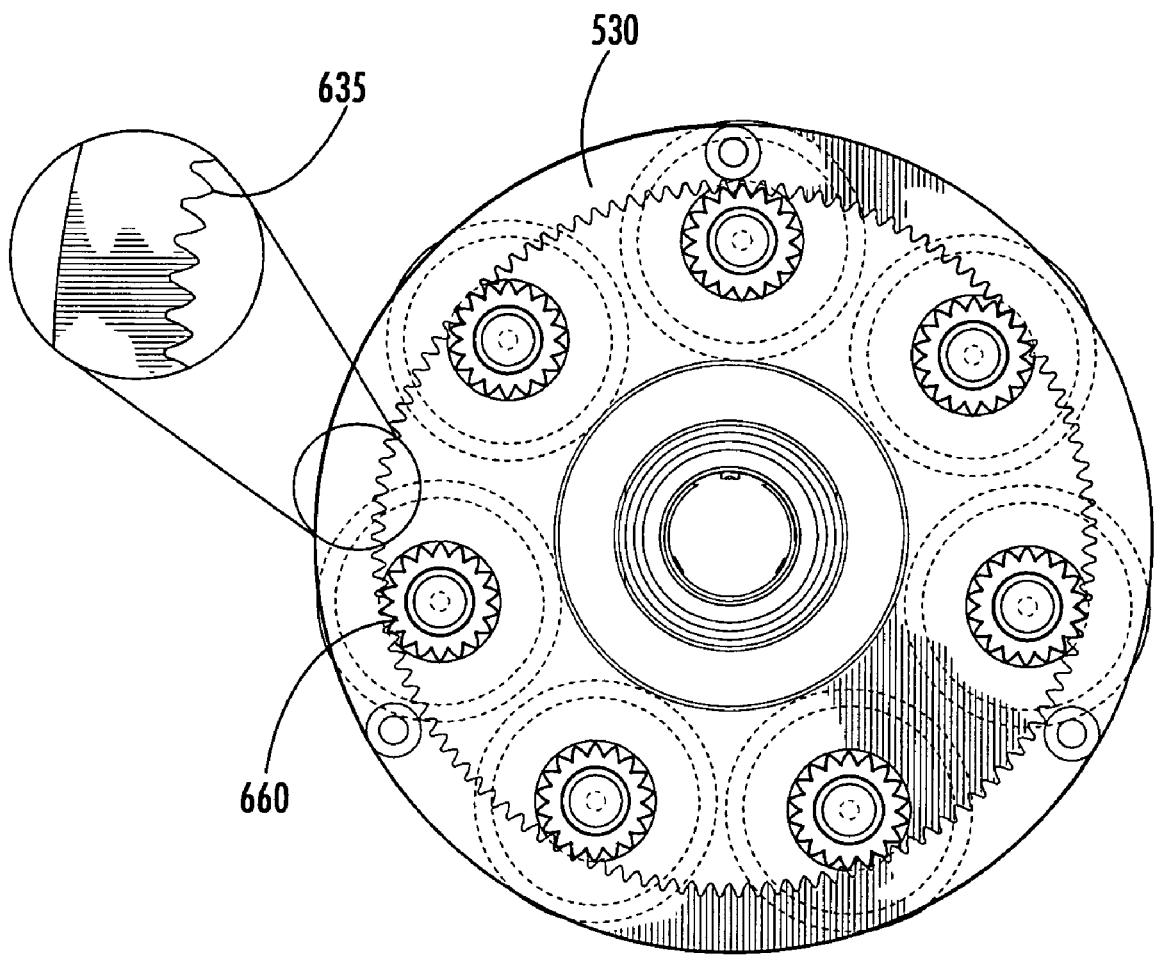
FIG. 14 is a cross section perspective of the reverse peristaltic idler roll depicting the spur gears drivingly intermeshing with an annular ring gear.

A plurality of spur gears 530 are disposed on the pumping rollers. As illustrated in FIG. 11, the spur gears extend outwardly beyond the spool and can drivingly intermesh with a fixed ring gear 535. The ring gear is typically attached to a housing plate 550A. The housing plate and stationary shaft are typically keyed (see FIG. 11 at reference number 585). With reference to FIG. 14, the spur gears 530 are shown having a plurality of teeth 660 that drivingly intermesh with teeth 635 disposed on the ring gear. The movement of the pumping rollers about their own axes results in the spur gears driving about the annular ring gear. As a result, the spool and the pumping rollers are rotated about the stationary shaft in a direction that is the reverse direction of tape travel.

Figure 12:
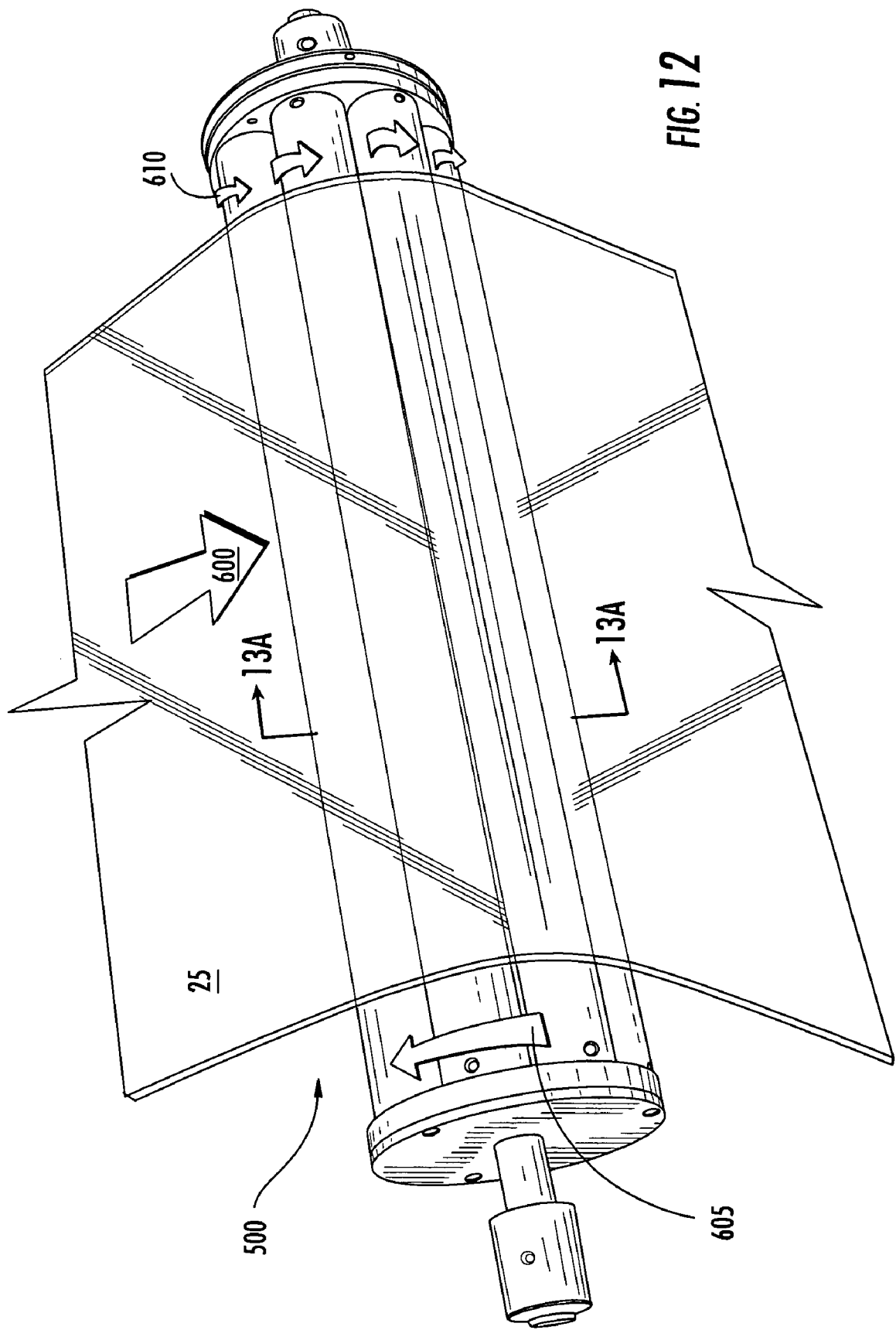
FIG. 12 is a graphical illustration depicting a tape passing over a reverse peristaltic idler roll.

As described above, tape travel over the RPR idler roll 500 causes the individual rollers to rotate about their own axes, which in turn causes the spool roller and pumping rollers as a whole, to rotate about the stationary shaft in an opposite direction. In this regard, FIG. 12 illustrates a tape 25 passing over the RPR idler roll 500. Travel of the tape, which is represented by the large arrow 600, over the pumping rollers causes them to rotate about their own axes in a direction represented by arrow 610 that is substantially the same direction of tape travel. As a result, the spool and pumping rollers rotate in a second direction represented by arrow 605 that is opposite the direction of tape travel.

Figure 13A:
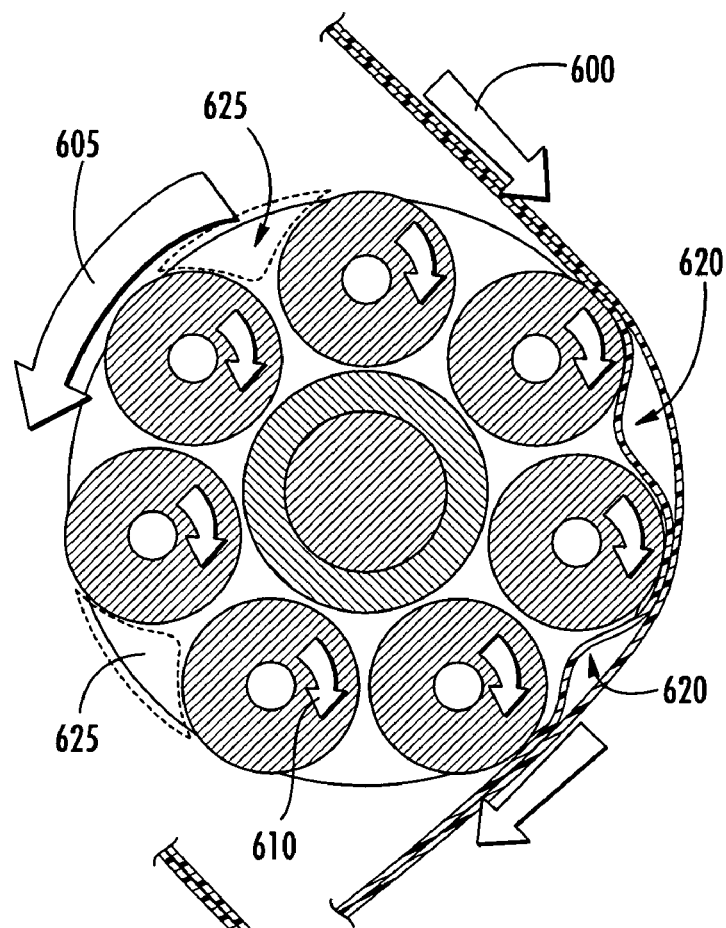
FIGS. 13A and 13B are cross section side perspectives of the reverse peristaltic idler roll depicting gases being pumped through the tape.
Figure 13B:
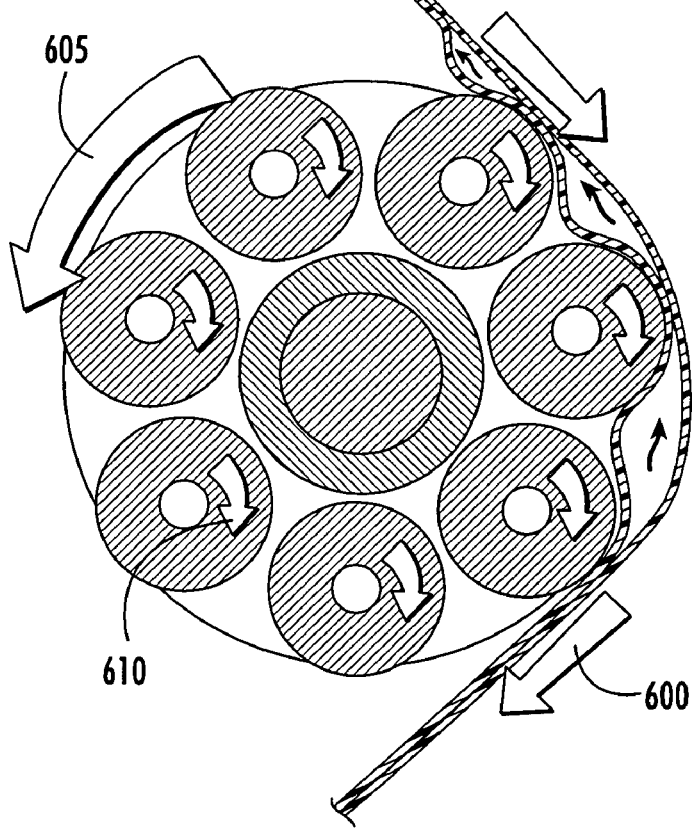

With reference to FIGS. 13A and 13B, the peristaltic pumping action of the RPR idler roll 500 is illustrated viewed along line 13A of FIG. 12. Gases contained within the tape are trapped in passive channels 625 that are created by the space between the pumping rollers. The rotation of the spool and plurality of pumping rollers (see arrow 605) in the reverse direction of tape travel, pumps the trapped gases 620 in the opposite direction of tape travel. The travel of the gases is represented in FIG. 13B by the small wavy arrow.

Referring back to FIG. 11, housing plates 550A and 550B can be used to enclose and protect various components associated with the spool roller, such as the ring gear, spur gears, bearings, and the like. The housing plate enclosing the ring gear 535 can also include a grease nipple 570 for lubricating the spur gears and ring gear. The housing plates can have a central opening 580 through which the stationary shaft can be inserted. The housing plate 550A is typically fixed to the stationary shaft, and housing plate 550B is typically attached to the spool.

Figure 15:
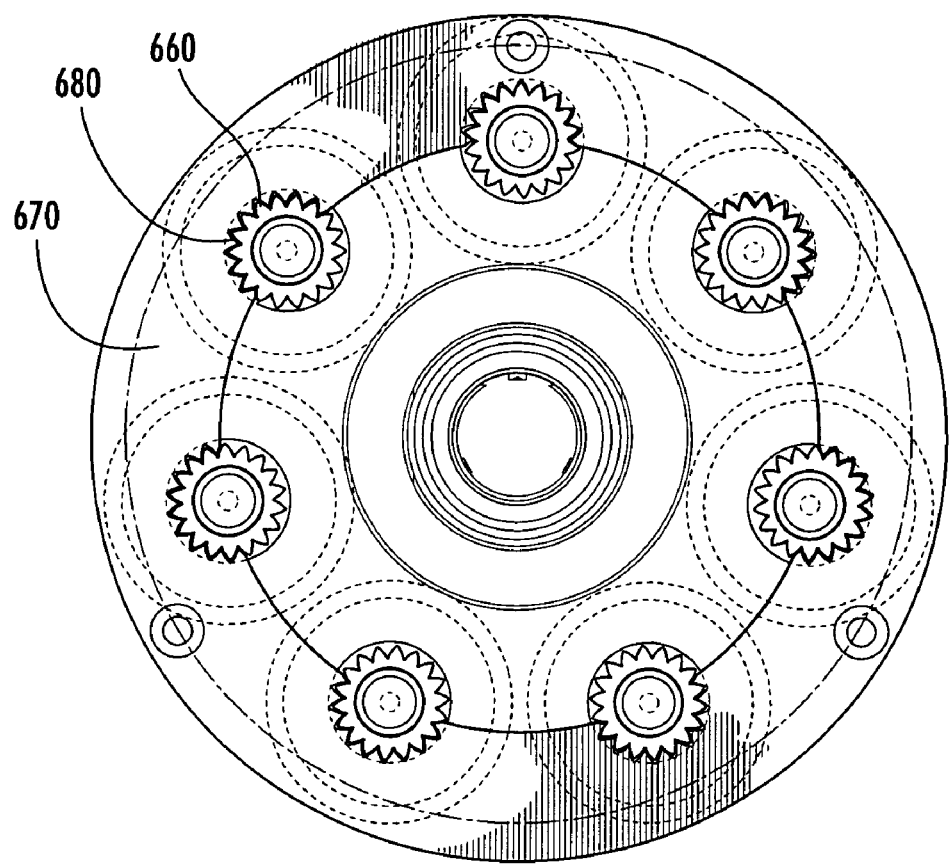
FIG. 15 is a side perspective depicting a locking gear.
Figure 15A:
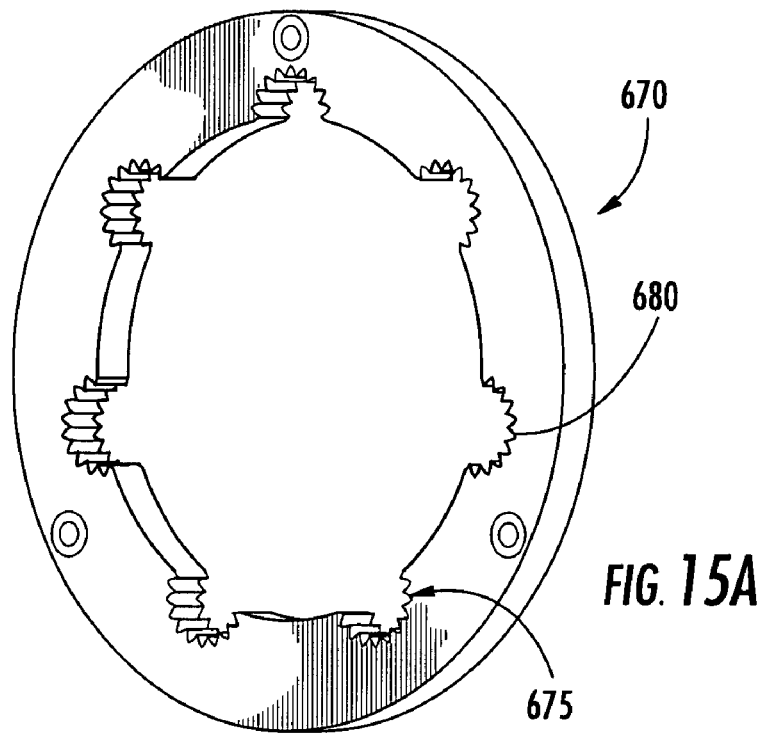
FIG. 15A is a graphical illustration depicting a reverse peristaltic idler roll locking gear.

In an alternate embodiment, the RPR idler roll 500 can be adapted so that it pumps gases in the direction of tape travel. This can be accomplished with a locking mechanism that can be attached to the RPR idler roller to prevent rotation of the spur gears about their own axes. In this regard, FIGS. 15 and 15A illustrate a locking mechanism 670 that has been attached to the RPR idler roll 500 between the ring gear and the spur gears. As depicted in FIG. 15A, a locking mechanism 670 is illustrated that comprises a ring having a plurality of semi-circles 675 with teeth 680. Each geared semi-circle corresponds to a spur gear. The gears 680 on the locking mechanism lockingly intermesh with the spur gears 660. The locking mechanism prevents the plurality of pumping rollers from rotating about their own axes. A housing plate similar to 550B can be substituted for housing plate 550A. As a result, tape travel over the roll can rotate the spool roller and pumping rollers collectively in the same direction as tape travel. In this embodiment, gases trapped in the passive channels are pumped in the direction of tape travel as the spool and pumping rollers rotate about the stationary shaft in the same direction.

The diameter and length of the RPR idler roll 500 can be varied depending upon the particular film being produced. Typically, the diameter of the RPR idler can be from about 1 to 24 inches, with a diameter from about 4 to 18 inches being somewhat more typical. The length of the idler roll can vary from about 2 to 150 inches, with a length from about 4 to 64 inches being somewhat more typical. Additionally, the exact number of pumping rollers can be varied depending upon design preferences and individual performance.

It should be evident from the foregoing description that the nip roll assembly and the RPR idler roll can be adapted for use in a wide variety of film producing applications.

EXAMPLES

Figure 16:
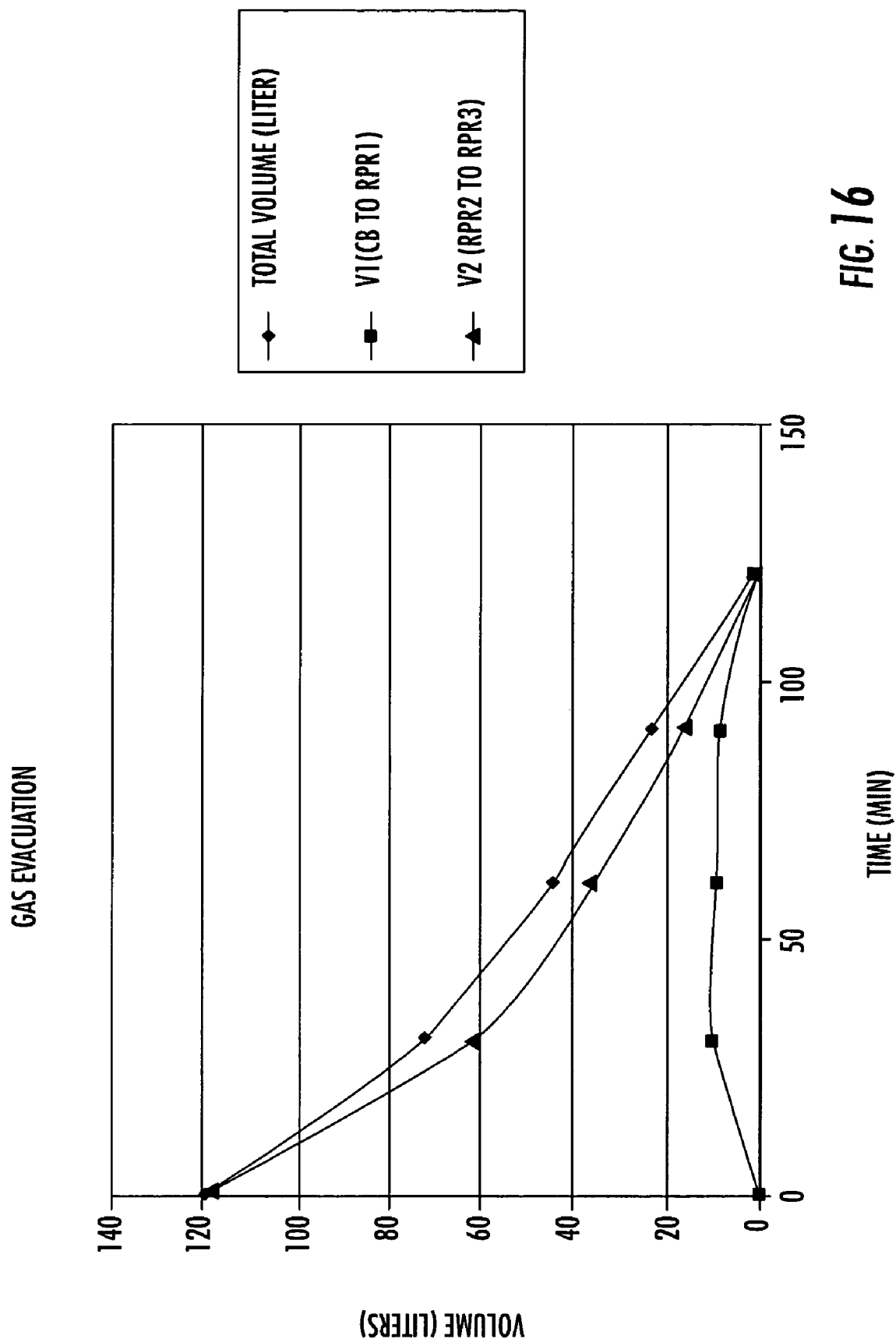
FIGS. 16 and 17 are graphical illustrations showing the volume of gas evacuated over time using a nip roll assembly and RPR idler rolls that are in accordance with the invention.
Figure 17:
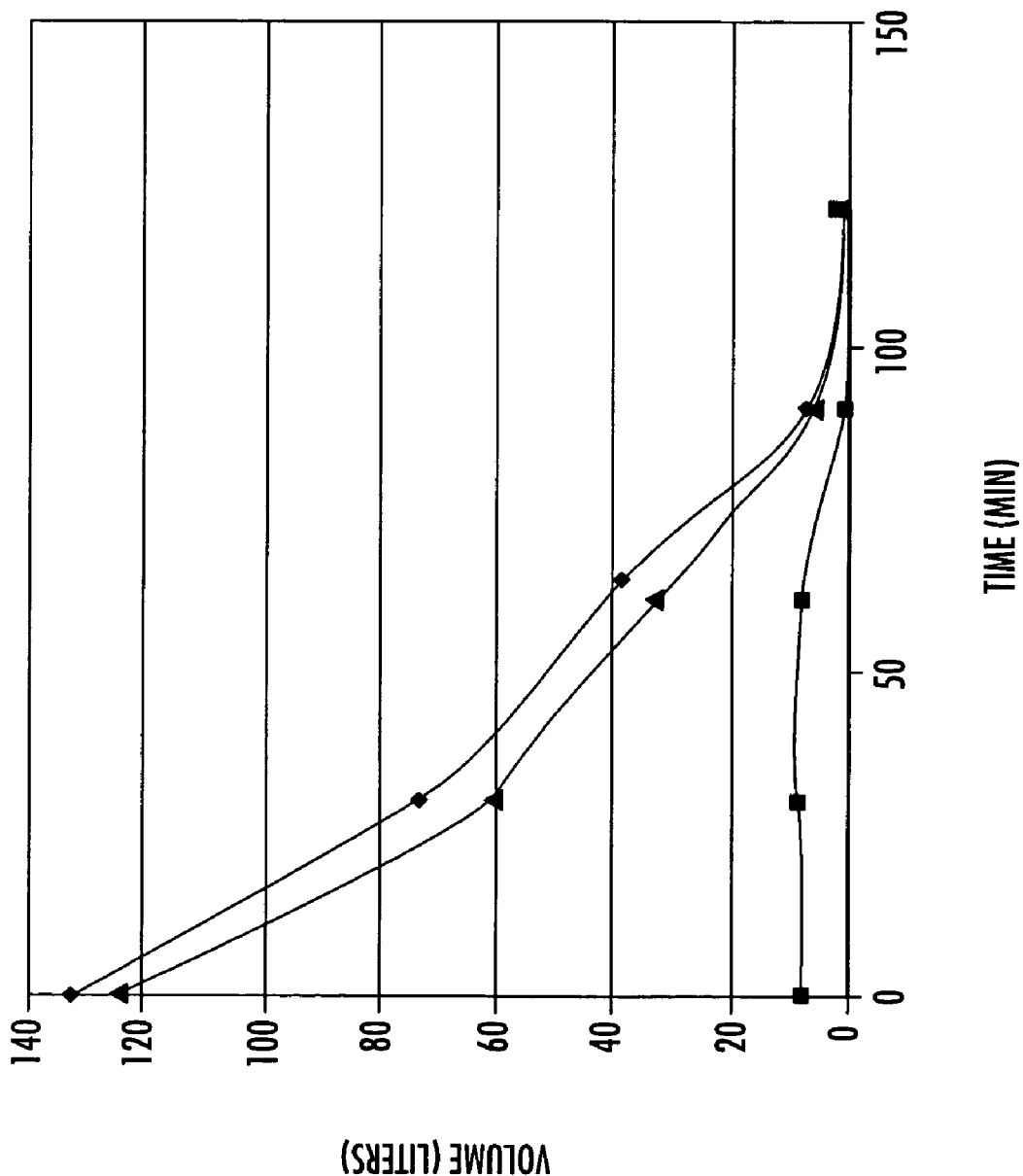

The effectiveness of reverse migration was gauged by the volumetric increase or decrease in tape inflation. To determine the effective area due to gas buildup, the cross-sectional area was measured. Then the effective volume was calculated based on these measurements. These measurements were taken at specific points in the process over a set period. Plotting these points revealed the migration of gases through each step of the process. For example, a tape with inflated edges due to gas buildup was observed in most trials. The cross section of the tape varied from an ellipse to a "dog bone" profile as the tape flattened during reverse degassing. The width and depth of the each side of the inflated tape was measured with a ruler. Measurements were taken at set points following the nip roll assembly and each RPR idler of nip roll. This data is plotted in charts that are illustrated in FIGS. 16 and 17. The charts show a steadily decreasing cross sectional area from the degasser to the cold bath nip. This would indicate the occurrence of reverse degassing.

Example 1

Figure 18:
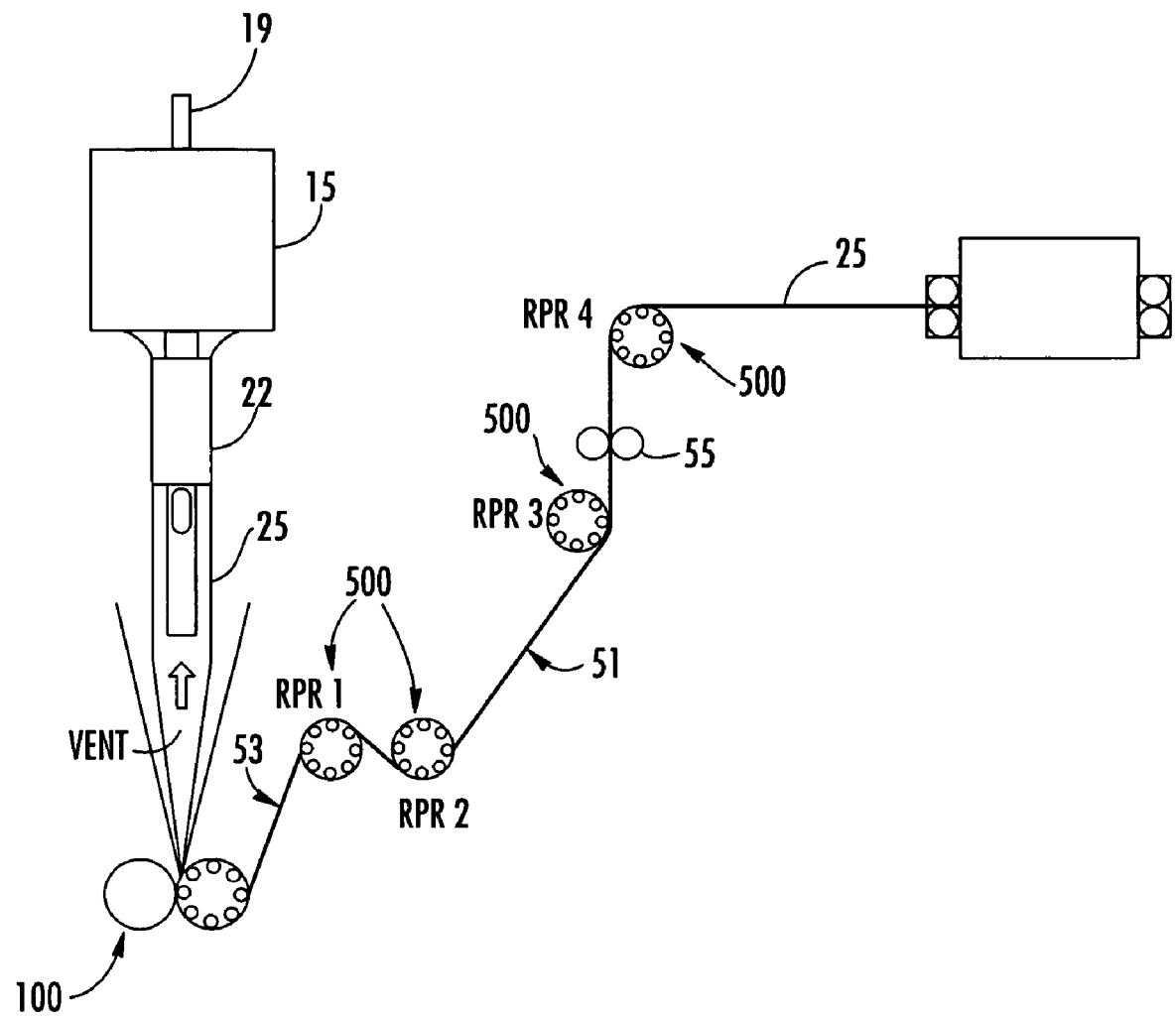
FIG. 18 is a schematic illustration of the film production line that was used to acquire the data in FIGS. 16 and 17.

With reference to FIGS. 16 and 18, the pumping capability of a film production line having a nip roll assembly and four RPR idler rolls was determined. The line comprised a round die through which a three-layered tubular film was extruded. The extruded film passed through an air shoe 22 and was driven forward into a cold bath (CB) containing the nip roll assembly 100. The tape then passed traveled over four RPR idler rolls 500, referred to as RPR 1 RPR 2; RPR 3; and RPR 4 that were arranged in a S-pattern. The speed of the line was from about 20 to 25 feet/minute (fpm). During the test run, air was injected into the tube between RPR 2 and RPR 3 at 51. The volume of the air was measured at specific points between the CB and RPR 1 at 53, and between RPR 2 and RPR 3 at 51. A pinch roll 55 was disposed between RPR 3 and RPR 4 to prevent any forward migration of the air. The initial volume of air was determined using the method outlined above. The volume was measured on 30 minute increments to track the progress of the pumping. With reference to FIG. 16, V1 refers to the volume of air being pumped between the nip roll assembly disposed in the cold bath (CB) and RPR 1. V2 refers to the volume of air being pumped between RPR 2 and RPR 3. In the initial measurements, the volume of air present between CB and RPR 1 was initially low until the air present between RPR 2 and RPR 3 equalized with the pumping capacity of the nip roll assembly. After equalization, the volume of air present in the tape steadily decreased to near zero. Thus, the combination of the nip roll assembly and RPR idler rolls effectively reverse pump gases trapped in the tape.

Example 2

With reference to FIG. 17, the experimental conditions were identical to Example 1, except that the driven peristaltic roll was run at an over speed of about 11%. V1 and V2 are the same as described in Example 1. The same positive results were achieved in approximately 11% less time. As is evident from the data in FIG. 17, the speed at which the nip roll assembly pumps gases can be adjusted to effectively handle varying levels of gases within the tape.

Many modifications and other embodiments of the invention set forth herein will come to mind to one skilled in the art to which the invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A nip roll assembly for driving a tape in a forward direction comprising:
   a driven nip roll driven in a forward direction;
   a driven peristaltic roll driven in a reverse direction, said driven peristaltic roll comprising a pumping section having a plurality of generally elongated pumping rollers circumferentially spaced about an idler shaft, said pumping rollers each being independently rotatable about their own axes; and
   a driven power transfer shaft in mechanical communication with a motor, said driven nip roll, and said idler shaft, such that rotation of said transfer shaft rotates said driven nip roll in the forward direction and said pumping section in the reverse direction.

2. The nip roll assembly according to claim 1 further comprising a single motor for driving said driven nip roll and said driven peristaltic roll.

3. The nip roll assembly according to claim 1, wherein said driven nip roll and said driven peristaltic roll are disposed between a proximal housing member and a distal housing member.

4. The nip roll assembly according to claim 3, wherein said idler shaft extends from the proximal housing member to the distal housing member, whereby rotation of said idler shaft in the reverse direction rotates said pumping section in the reverse direction.

5. The nip roll assembly according to claim 4, wherein the driven peristaltic roll further includes a nip section, said nip section independently rotatable about said idler shaft.

6. The nip roll assembly according to claim 5, wherein said nip section is a generally cylindrical roll adapted for nippingly engaging said nip roll, whereby said nip section is rotated in the forward direction by the rotation of said nip roll in the forward direction.

7. The nip roll assembly according to claim 1, wherein said driven peristaltic roll further includes a proximal stabilizing member and a distal stabilizing member.

8. The nip roll assembly according to claim 7, wherein said driven peristaltic roll is comprised of a first and second pumping section and a nip section disposed therebetween.

9. The nip roll assembly according to claim 6, wherein the driven peristaltic roll is comprised of a pumping section disposed between a first and second nip section.

10. The nip roll assembly according to claim 1, wherein said driven peristaltic roll rotates at a higher speed than said driven nip roll.

11. The nip roll assembly according to claim 4, wherein the driven power transfer shaft extends from said proximal housing member to said distal housing member.

12. A nip roll assembly for driving a tape in a forward direction comprising:
    distal and proximal housing members;
    a generally cylindrical driven nip roll disposed between said distal and said proximal housing members;
    a power transferring shaft extending from the distal housing member to the proximal housing member, said transferring shaft rotatably driveable by a motor and in mechanical communication with said driven nip roll, whereby said driven nip roll and said transferring shaft are rotated in the forward direction;
    an idler shaft extending from the proximal housing member to the distal housing member, said idler shaft in mechanical communication with said power transferring shaft whereby rotation of said power transferring shaft rotates said idler shaft in a reverse direction;
    a driven peristaltic roll rotatably disposed on said idler shaft and substantially parallel to said driven nip roll, said driven peristaltic roll having a pumping section and nip section, said pumping section comprising a plurality of generally elongated pumping rollers circumferentially spaced about said idler shaft, said pumping rollers each independently rotatable about their own axes, said pumping section rotatably drivable by said idler shaft in a reverse direction, and the nip section having a surface for nippingly engaging said driven nip roll, whereby rotation of said driven nip roll rotates said nip section in the forward direction.

13. A nip roll assembly according to claim 12, wherein the pumping section further comprises:
    a first and second support member fixedly attached to said idler shaft, said pumping rollers disposed between said first and second support members, and wherein said pumping rollers are adapted to rotate independently of the pumping section.

14. The pumping section according to claim 13, wherein the plurality of pumping rollers have a proximal and distal end, and wherein the proximal and distal end are each rotatably supported by friction reducing members disposed within said support members.

15. The pumping section according to claim 14, wherein the friction reducing members are idler bearings.

16. The pumping section according to claim 15, wherein the idler bearings are stainless steel, aluminum, bronze, or ceramic.

17. The nip roll assembly according to claim 12, wherein the nip section is supported on the idler shaft by at least one idler bearing.

18. The nip roll assembly according to claim 17, wherein said bearings are ceramic.

19. The nip roll assembly according to claim 13, wherein the driven peristaltic roll is comprised of a first and second pumping section and a nip section disposed therebetween.

20. The nip roll assembly according to claim 13, wherein the driven peristaltic roll is comprised of a first and second nip section and a pumping section disposed therebetween.

21. The nip roll assembly according to claim 12, wherein the driven peristaltic roll is detachable from the housing members.

22. The nip roll assembly according to claim 21, wherein the driven peristaltic roll further includes a proximal and distal roller detaching member, whereby the driven peristaltic roll is detachable from the housing members.

23. The nip roll assembly according to claim 12, wherein the lengths of the nip roll and the driven peristaltic roll are from about 2 to 150 inches.

24. The nip roll assembly according to claim 12, wherein the diameters of the nip roll and the driven peristaltic roll are from about 1 to 64 inches.

25. An apparatus for forming a polymeric film comprising:
   a) a die capable of extruding a film, said die having a vent for removing gases from within a film;
   b) a nip roll assembly disposed adjacent to said die, said nip roll assembly comprising a driven nip roll for driving a film forward from said die, and a driven peristaltic roll, said driven peristaltic roll nippingly engaging said driven nip roll, and said driven peristaltic roll comprising a pumping section having a plurality of generally elongated pumping rollers circumferentially spaced about a central axis, said pumping rollers each being independently rotatable about their own axes in the forward direction, whereby said pumping rollers are adapted pump gases trapped in a film in the reverse direction of film travel;
   c) a windup roll capable of receiving a film; and
   d) a plurality of idler rolls adapted to pump gases in the reverse direction of film travel, said idler rolls defining a film path between said nip roll assembly and said windup roll, said idler roll comprising a spool roller having a plurality of pumping rollers circumferentially spaced around said spool roller, said spool roller and said plurality of pumping rollers adapted to rotate in the reverse direction of film travel, whereby gases trapped in said film are pumped in the reverse direction of film travel.

26. An apparatus according to claim 25, wherein said nip roll assembly is disposed in a chill bath.

27. An apparatus according to claim 25, further comprising an irradiation source capable of crosslinking a film, said irradiation source disposed between said plurality of idler rolls and said windup roll.

28. An apparatus according to claim 25, further comprising a nip roll assembly adjacent to said irradiation source.

29. A nip roll assembly for driving a film in a forward direction comprising:
   a driven nip roll driven in a forward direction; and
   a driven peristaltic roll driven in a reverse direction, said driven peristaltic roll comprising a pumping section having a plurality of generally elongated pumping rollers circumferentially spaced about an idler shaft, said pumping rollers each being independently rotatable about their own axes, wherein the driven peristaltic roll further includes a nip section, said nip section being independently rotatable about said idler shaft.

30. The nip roll assembly of claim 29, wherein said driven peristaltic roll is comprised of a first and second pumping section and said nip section disposed therebetween.

* * * * *

UNITED STATES PATENT AND TRADEMARK OFFICE
CERTIFICATE OF CORRECTION

PATENT NO.       : 7,500,841 B2
APPLICATION NO.  : 10/878474
DATED            : March 10, 2009
INVENTOR(S)      : Audet et al.

Page 1 of 1

It is certified that error appears in the above-identified patent and that said Letters Patent is hereby corrected as shown below:

<u>Column 2,</u>

Line 34-50, delete the description for FIG. 1, beginning with "FIG. 1 shows a system for irradiating skin in accordance with the invention. . . . through the end of the paragraph to . . . contains a processor 9 for monitoring and controlling various functions of the device." . . .and insert the following:

--Fig. 1 is a schematic illustration of a blown film process line that is in accordance with the invention;--.

Signed and Sealed this

Second Day of June, 2009

JOHN DOLL
*Acting Director of the United States Patent and Trademark Office*